United States Patent
Ozdemir

(10) Patent No.: US 12,091,754 B2
(45) Date of Patent: Sep. 17, 2024

(54) INTERNALLY COOLED AERODYNAMICALLY CENTRALIZING NOZZLE (ICCN)

(71) Applicant: Northeastern University, Boston, MA (US)

(72) Inventor: Ozan C. Ozdemir, Somerville, MA (US)

(73) Assignee: Northeastern University, Boston, MA (US)

( * ) Notice: Subject to any disclaimer, the term of this patent is extended or adjusted under 35 U.S.C. 154(b) by 597 days.

(21) Appl. No.: 16/855,519

(22) Filed: Apr. 22, 2020

(65) Prior Publication Data

US 2020/0376507 A1     Dec. 3, 2020

Related U.S. Application Data

(60) Provisional application No. 62/838,064, filed on Apr. 24, 2019, provisional application No. 62/837,675, filed on Apr. 23, 2019.

(51) Int. Cl.
    *C23C 24/04*        (2006.01)
    *B05B 7/14*         (2006.01)
    (Continued)

(52) U.S. Cl.
    CPC ............ *C23C 24/04* (2013.01); *B05B 7/1486* (2013.01); *B05B 7/1606* (2013.01);
    (Continued)

(58) Field of Classification Search
CPC .............................................. B05B 7/14–1693
See application file for complete search history.

(56) References Cited

U.S. PATENT DOCUMENTS 2,065,462 A * 12/1936 Olsson ...................... B05B 7/04
                                                                            510/463
6,139,913 A     10/2000 Van Steenkiste et al.
(Continued)

FOREIGN PATENT DOCUMENTS

EP           2657368 A1     10/2013

OTHER PUBLICATIONS

Bhattiprolu, et al., "Influence of feedstock powder and cold spray processing parameters on microstructure and mechanical properties of Ti—6Al1-4V cold spray," Surface & Coating Tech., 335:1-12 (2018).

(Continued)

*Primary Examiner* — Yewebdar T Tadesse
*Assistant Examiner* — Stephen A Kitt
(74) *Attorney, Agent, or Firm* — Hamilton, Brook, Smith & Reynolds, P.C.

(57) ABSTRACT

An embodiment is a nozzle for use in additive manufacturing and other applications. The nozzle defines a flow path and is configured to generate a supersonic flow of particles or fluid during operation. The embodiment provides at least one auxiliary flow path port that is configured to introduce an auxiliary flow into the nozzle relative to the flow path that protects an internal surface of the nozzle from wear and corrosion, thereby extending the life of the nozzle for extended periods of continuous operation. An embodiment centralizes particle location along its continuous flow path to achieve small footprint material deposition, thereby increasing 3D print resolution for building more intricate components.

15 Claims, 15 Drawing Sheets
(10 of 15 Drawing Sheet(s) Filed in Color)

(51) Int. Cl.
  *B05B 7/16*   (2006.01)
  *B22F 10/322* (2021.01)
  *B22F 12/53*  (2021.01)
  *B22F 12/90*  (2021.01)
  *B29C 64/209* (2017.01)
  *B33Y 30/00*  (2015.01)

(52) U.S. Cl.
  CPC ............ *B22F 10/322* (2021.01); *B22F 12/53* (2021.01); *B22F 12/90* (2021.01); *B29C 64/209* (2017.08); *B33Y 30/00* (2014.12); *B05B 7/162* (2013.01)

(56) References Cited

U.S. PATENT DOCUMENTS

| | | | |
|---|---|---|---|
| 6,722,584 B2 | 4/2004 | Kay et al. | |
| 6,743,468 B2* | 6/2004 | Fuller | B05B 7/1486 427/427 |
| 8,906,450 B1 | 12/2014 | McInerney et al. | |
| 9,079,209 B2 | 7/2015 | Kim et al. | |
| 9,095,858 B2 | 8/2015 | Fukanuma | |
| 9,139,912 B2 | 9/2015 | Kim et al. | |
| 9,168,546 B2 | 10/2015 | Xue et al. | |
| 2002/0168466 A1 | 11/2002 | Tapphorn et al. | |
| 2003/0178511 A1 | 9/2003 | Dolatabadi et al. | |
| 2004/0191449 A1 | 9/2004 | Haynes et al. | |
| 2006/0038044 A1* | 2/2006 | Van Steenkiste | B05B 7/1486 239/594 |
| 2006/0040048 A1 | 2/2006 | Han et al. | |
| 2006/0275554 A1 | 12/2006 | Zhao et al. | |
| 2010/0151124 A1* | 6/2010 | Xue | C23C 4/12 239/398 |
| 2011/0104369 A1* | 5/2011 | Kim | C23C 24/04 118/308 |
| 2013/0087633 A1 | 4/2013 | Fukanuma | |

OTHER PUBLICATIONS

Bird, et al.,"Transport Phenomena," Second Ed. New York: John Wiley and Sons, Inc, 2002.
Camilleri, S, SPEE3D, On demand High volume 3D metal printing, in Cold Spray Action Team Meeting, Boston, Ma USA, 2017: U.S. Army Research Laboratory, 15 pages.
Champagne & Helfritch, "A demonstration of the antimicrobial effectiveness of various copper surfaces," J. Biol. Eng., 7:8 (2013).
Champagne, V.K., "The Repair of Magnesium Rotorcraft Components by Cold Spray," J. Fail. Anal. and Preven. 8:164-175 (2008).
Cormier, "Pyramidal Fin Arrays Performance Using Streamwise Anisotropic Materials by Cold Spray Additive Manufacturing," JTTEE5 25:170-182 (2016).
Cruz, et al, "Wear resistance of cold sprayed Al alloys for aeronautical repairs," Surface Engineering, 35(4):295-303 (2019).
Fukanuma, et al., Simulation of Cold Spray Nozzle Accompanying a Water-cooling Adjustment Plasma Giken Co., Saitama, Japan, 6 pages.
Gabriel, et al., "Final Report Cold Spray for Repair of Magnesium Components ESTCP Project WP-200620," (Nov. 2011).
Ozdemir, et al., "Estimating the Effect of Helium and Nitrogen Mixing on Deposition Efficiency in Cold Spray," J. Therm Spray Tech., 25(4):660-671 (2016).
Ozdemir, et al., "Influence of Powder Injection Parameters in High-Pressure Cold Spray," J. Therm. Spray Technol., journal article vol. 26, No. 7, pp. 1411-1422, Aug. 4, 2017.
Siopsis, et al., "Study of Nozzle Clogging During Cold Spray," United Tech Res. Ctr., 16 pages (2011).
Wang, et al., "Investigation on the Clogging Behavior and Additional Wall Cooling for the Axial-Injection Cold Spray Nozzle," J. Therm. Spray Tech., 24(4) 696-701 (2015).
Widener, et al., "Application of High-Pressure Cold Spray for an Internal Bore Repair of a Navy Valve Actuator," J. Therm. Spray Tech., 11 pages (2015).
Xu, et al., "Thermal Conductivity of Polymers and Their Nanocomposites," Adv. Mater. 10 pages (2018).

* cited by examiner

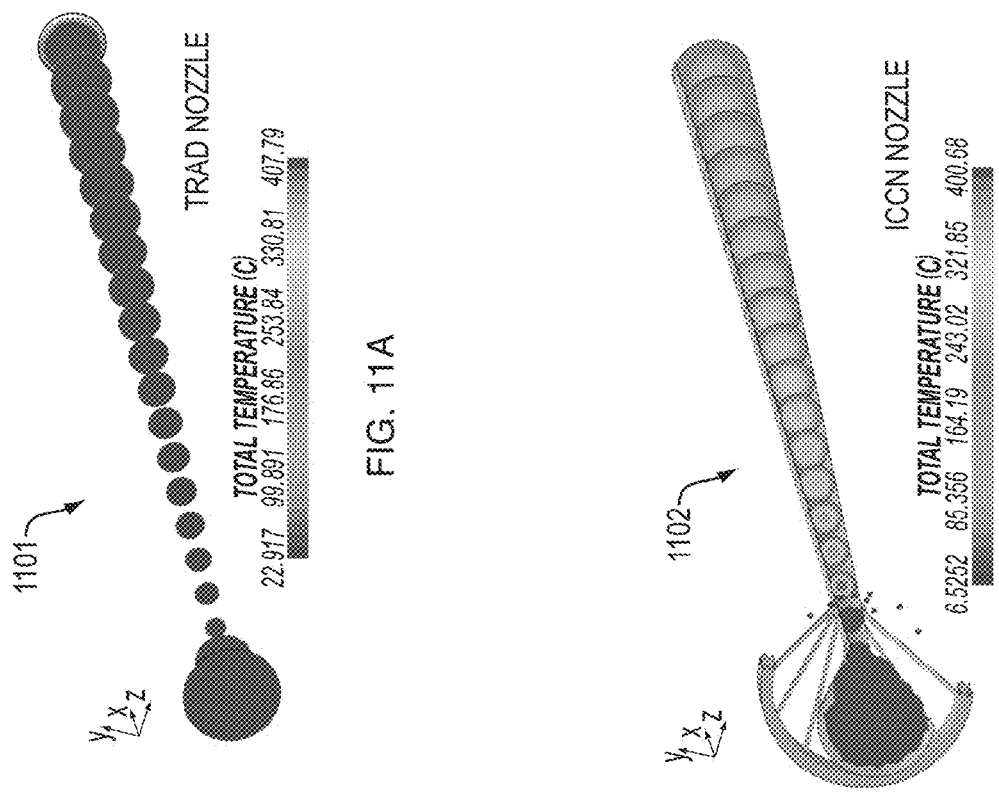
FIG. 11A
FIG. 11B
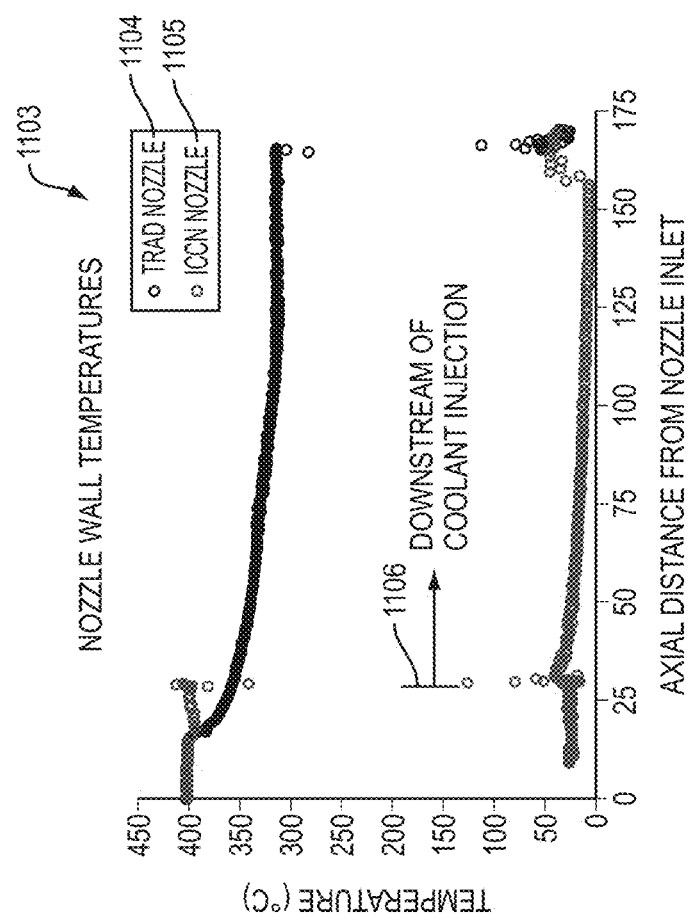
FIG. 11C

INTERNALLY COOLED AERODYNAMICALLY CENTRALIZING NOZZLE (ICCN)

RELATED APPLICATIONS

This application claims the benefit of U.S. Provisional Application No. 62/837,675, filed on Apr. 23, 2019 and U.S. Provisional Application No. 62/838,064, filed on Apr. 24, 2019. The entire teachings of the above applications are incorporated herein by reference.

GOVERNMENT SUPPORT

This invention was made with government support under Grant Number W911NF-15-2-0026 awarded by the Army Research Office. The government has certain rights in the invention.

BACKGROUND

Additive manufacturing is a process for building materials onto surfaces. Additive manufacturing is utilized to create, repair, and add features to objects.

Surface technology encompasses industrial processes that modify object surfaces to protect them from wear, corrosion, and other deterioration that may be caused by the environment in which they operate.

SUMMARY

Use of additive manufacturing and surface technology is widespread; however, additive manufacturing and surface technology can benefit from improvements. Embodiments of the present invention provide such improvements with an internally cooled nozzle and related methods and systems.

Cold spray is an example additive manufacturing technique which may utilize embodiments. Further, it is noted that while embodiments are described as being utilized for cold spray and additive manufacturing functionality, embodiments are not so limited and may be utilized for any functionality where such a nozzle, method, or system is needed.

An embodiment of the present invention is directed to a nozzle comprising a converging portion that defines a flow path that decreases in cross-sectional area from an inlet port to a converging portion throat port. The nozzle further comprises a throat region that defines a flow path having a cross-sectional area that matches the cross-sectional area of the converging portion throat port. Further, the nozzle includes a supersonic portion that defines a flow path to an outlet port. The supersonic portion has a supersonic portion throat port with a cross-sectional area that matches or is slightly larger than the cross-sectional area of the throat region. In such an embodiment, the flow paths of the converging portion, throat region, and supersonic portion define a continuous flow path from the inlet port to the outlet port and at least one of the converging portion, throat region, and supersonic portion define an auxiliary flow path port configured to enable an auxiliary flow to be introduced into the continuous flow path.

Applicant notes that herein, the articles "a" and "an" are in no way limiting and, as such, the articles "a" and "an" encompass "at least one of."

According to an embodiment, the auxiliary flow path port is at a non-perpendicular angle in relation to the continuous flow path. In another embodiment, the cross-sectional areas of the respective flow paths have dimensions that accommodate a flow that includes at least one of: particles, a single-phase compressible fluid, and a multi-phase compressible fluid. In yet another embodiment, the auxiliary flow path port has dimensions that accommodate an auxiliary flow that includes at least one of: coolant and particles. Embodiments may operate with particles of any nature, i.e., particles in any form, including solid, liquid, and vapor particles. Likewise, in embodiments, particles may be composed of any material, or may be combinations of multiple materials, e.g., blended powders, metal matrix ceramic composite polymers, and encapsulated powders, amongst other examples.

Another embodiment of the nozzle further includes an auxiliary flow path structure that defines an auxiliary flow path that is fluidically coupled to the auxiliary flow path port. In such an embodiment the auxiliary flow path and auxiliary flow path port have respective cross-sectional areas with dimensions that accommodate the auxiliary flow to be subsonic or supersonic.

In an embodiment, at least one of the converging portion, throat region, and supersonic portion define a plurality of auxiliary flow path ports symmetrically or asymmetrically arranged about the continuous flow path. Further, yet another embodiment includes a splitter arranged to cause a flow within the continuous flow path to divide into multiple flow paths. Such an embodiment of the nozzle may also include a reverse auxiliary flow path port arranged to introduce a reverse auxiliary flow into the continuous flow path at the splitter.

An embodiment of the nozzle comprises a jacket coupled to the nozzle that forms a pressure chamber surrounding the auxiliary flow path port. In another embodiment, the auxiliary flow path port includes two or more auxiliary flow path ports and the pressure chamber surrounds the two or more auxiliary flow path ports.

In an alternative embodiment, the auxiliary flow path port includes a plurality of auxiliary flow path ports comprising a first grouping of auxiliary flow path ports and a second grouping of auxiliary flow path ports. According to such an embodiment, the nozzle may further comprise a first jacket coupled to the nozzle that forms a first pressure chamber surrounding the first grouping of auxiliary flow path ports and a second jacket coupled to the nozzle that forms a second pressure chamber surrounding the second grouping of auxiliary flow path ports. Further, it is noted that embodiments may include any number of auxiliary flow path ports and, likewise, may include any number of jackets.

In an embodiment, a length of the flow path of the supersonic portion has increasing cross-sectional area. In another embodiment, a length of the flow path of the supersonic portion has constant cross-sectional area. According to yet another embodiment, a length of the flow path of the supersonic portion is curved and the auxiliary flow path port is at the curved length of the flow path of the supersonic portion. In embodiments, the cross-sectional area of lengths of the supersonic portion may vary depending on desired flow characteristics. For instance, in an embodiment, the supersonic portion may diverge from the throat to an outlet to either keep sonic flow, or increase flow so as to achieve supersonic flow. In another embodiment, the cross-sectional area of the supersonic portion may increase rapidly and, then, increase slowly in two setups to first achieve supersonic flow then maintain supersonic flow. Further, in another embodiment, downstream of the throat there is a continuously diverging section so the cross-sectional area gets larger downstream of the throat so as to achieve is a supersonic flow. In yet another embodiment, the cross-sectional area increases in a way to keep the flow sonic or the cross-sectional area increases rapidly and then is kept constant (a straight section) to hold a constant supersonic flow. In such embodiments, the nozzle may include a subsonic converging section, a sonic throat section, a supersonic diverging section, and a supersonic straight supersonic section.

In another embodiment of the nozzle, a cross-sectional area of the outlet port is configured to accommodate a flow that is 1/10th mm to 100 mm in diameter.

Another embodiment of the present invention is directed to a cold spray system. The cold spray system includes a nozzle comprising (i) a converging portion that defines a flow path that decreases in cross-sectional area from an inlet port to a converging portion throat port, (ii) a throat region that defines a flow path having a cross-sectional area that matches the cross-sectional area of the converging portion throat port, and (iii) a supersonic portion that defines a flow path, having a supersonic portion throat port with cross-sectional area matching or slightly larger than the cross-sectional area of the throat region, to an outlet port. In the nozzle of the cold spray system, the flow paths of the converging portion, throat region, and supersonic portion define a continuous flow path from the inlet port to the outlet port and at least one of the converging portion, throat region, and supersonic portion defines an auxiliary flow path port configured to enable an auxiliary flow to be introduced into the continuous flow path.

Such a system embodiment also includes a sensor measuring an output flow in the continuous flow path at the outlet port and a controller configured to modify the auxiliary flow based on the output measured by the sensor. In an embodiment of the system, the controller is configured to perform at least one of (1) modifying a path of the flow in the continuous flow path through modifying the auxiliary flow and (2) modifying the auxiliary flow to control at least one of: resolution, i.e., geometrical dimensions, and angle of the output flow at the outlet port.

Yet another embodiment is directed to a method for controlling a flow through a nozzle. Such a method includes (i) converging a flow into a throat region of a nozzle using a converging portion of the nozzle, (ii) accelerating the flow upon exit of the throat region using a supersonic portion of the nozzle, and (iii) modifying the flow in at least one of the converging portion, the throat region, and the supersonic portion using an auxiliary flow.

Another embodiment is directed to an apparatus for controlling a flow. Such an apparatus includes a means for converging a flow and forming a first portion of a flow path. The apparatus also includes (i) a means for accelerating the flow in the flow path and forming a second portion of the flow path and (ii) a means for introducing an auxiliary flow to modify the flow in at least one of the first portion and the second portion of the flow path.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 11A is a contour plot of fluid temperature inside a traditional nozzle.

FIG. 11B is a contour plot of fluid temperature inside an embodiment of the present invention.

FIG. 11C is a plot comparing nozzle internal wall temperature of a traditional nozzle and an embodiment.

DETAILED DESCRIPTION OF THE INVENTION

Additive manufacturing processes, e.g., cold spray technology, are used for building metal, cermet (metal/ceramic mix), and polymer materials onto solid surfaces, repairing high value components, and printing metal and composite 3D structures [1-4] (bracketed numbers in this document refer to the enumerated list of references hereinbelow). For additive manufacturing processes, e.g., cold spray, particles (mainly metal and cermet particles of 1 to 150 micrometers) are accelerated through a convergent-divergent supersonic nozzle to achieve very high velocities. These particles deform and adhere to the targeted surface and to each other and generate low porosity and high strength depositions. Nozzle manipulation with a robot is used to build material in a desired geometry to perform repairs of worn/corroded surfaces, build coatings, or additively manufacture components. A major challenge in cold spray processing of certain powder materials that require high impact velocities is caused by the tendency of some powder materials (e.g., Ti-6Al-4V powders [5, 6], aluminum powders [7]) to wear or clog the supersonic spray nozzle when high gas temperatures and pressures are used. Nozzle material selection and external nozzle cooling methods have been shown to help, but do not resolve the issue. Nozzle clogging and wear reduces the applicability of cold spray, causes manufacturing interruptions, and increases manufacturing lead time, cost, and material waste. A new approach is needed.

Figure 1:
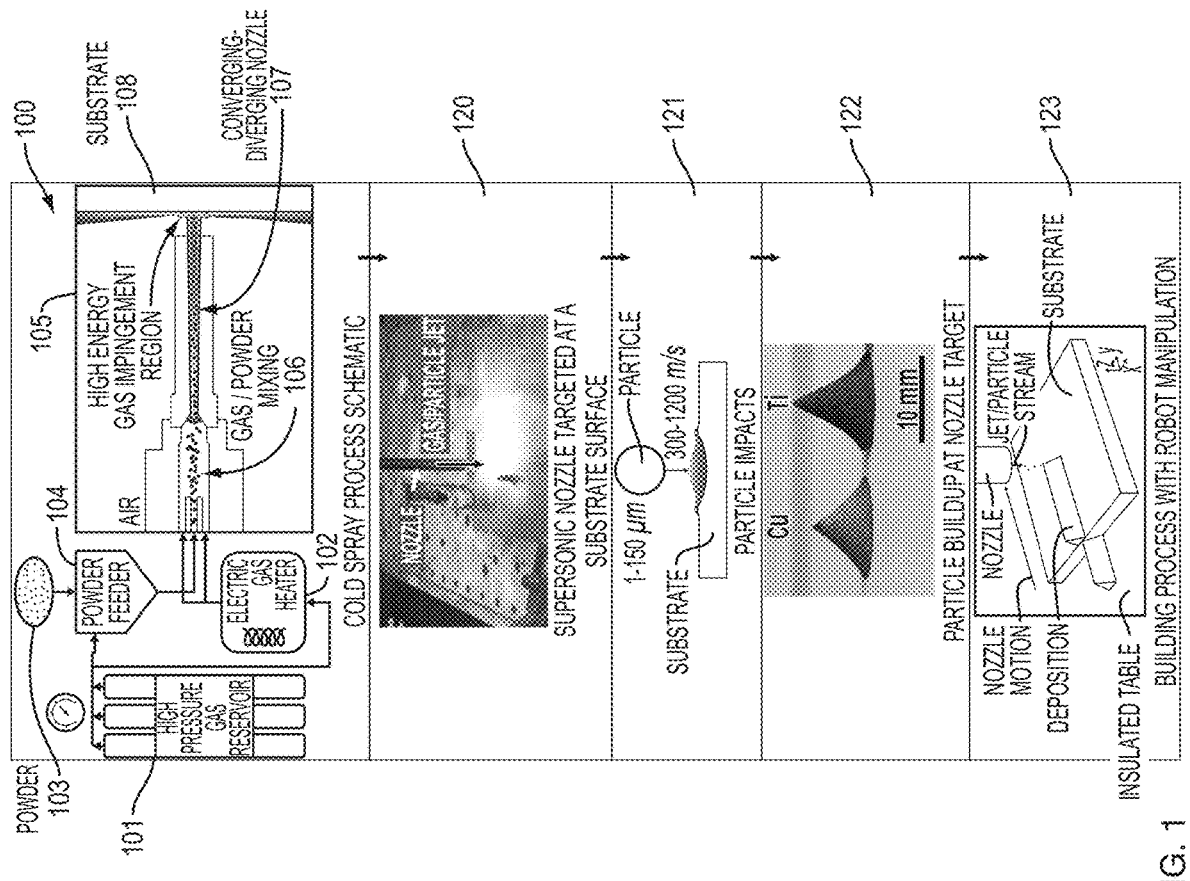
FIG. 1 is a diagram depicting a cold spray system and functionality of the system that may employ embodiments.

FIG. 1 shows a common configuration for a high pressure cold spray system 100 and the operations 120-123 that are implemented by the system 100 for building, repairing, coating, and manufacturing. The system 100 includes a gas reservoir 101, gas heater 102, powder 103, powder feeder 104, and nozzle 105. In operation, gas from the reservoir 101 is heated using the heater 102 and the gas is provided to the powder feeder 104 that includes the powder 103. The heated gas from the heater 102 and powder/gas mixture from the powder feeder 104 are provided to the nozzle 105 where the heated gas and powder combine in a mixing region 106 and, then, travel through a converging-diverging flow path 107 of the nozzle 105. From an outlet of the nozzle 105 the powder/gas flow is directed to a substrate 108.

The first operation 120 of the system 100 is targeting the nozzle 105 at a substrate surface. In turn, at 121 the particles impact the substrate 108. The particle impact 121 causes the particle buildup 122 at the nozzle target, e.g. the substrate 108. To continue, a robot is used to manipulate 123 the nozzle 105 to build up the particle material as desired, e.g., to build, coat, or repair an object, amongst other examples.

Figure 2:
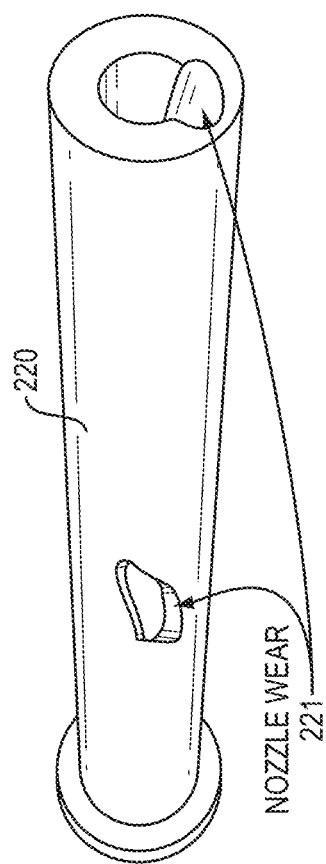
FIG. 2 illustrates a failed additive manufacturing nozzle.

A major challenge in cold spray processing of certain powder materials that require high impact velocities is caused by the tendency of some powder materials (e.g. Ti-6Al-4V powders [5, 6], aluminum powders [7]) to wear or clog the supersonic spray nozzles, e.g., the nozzle 105, when high gas temperatures and pressures are used. Aluminum powders tend to clog nozzles made of hard materials when cold spray process gas temperatures are sufficiently high in high pressure systems. Thermoplastics are generally used for cold spraying aluminum powders. Thermoplastic nozzles, when used properly, wear slowly and can prevent soft materials such as aluminum from depositing on its internal surfaces. However, thermoplastics (such as PBI "polybenzimidazole") have temperature limitations (425° C.) and nozzles wear quickly when used near glass transition temperatures [6]. FIG. 2 illustrates a traditional nozzle 220 with rapid wear 221 caused by improper assembly.

Figure 3:
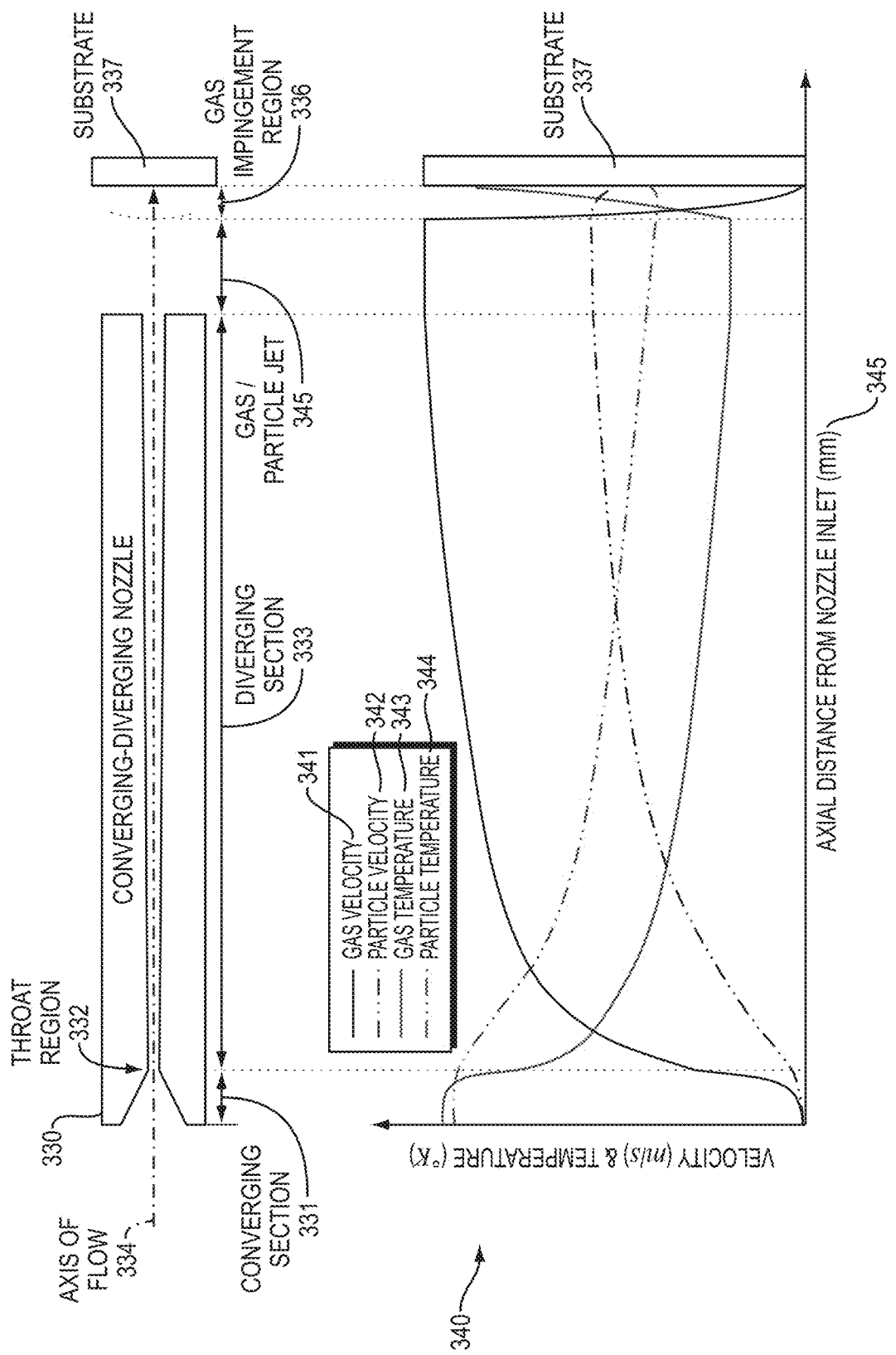
FIG. 3 is a simplified diagram of regions of a traditional nozzle and a plot illustrating gas and particle properties within the regions of the nozzle.

In systems where clogging and wear occurs in the diverging section of the cold spray nozzle, the systems are unable to detect the clog or wear as the gas flow rate does not immediately change. Thus, the cold spray deposition process continues normally during the initial stages of clogging and wear and may go undetected during short sprays. FIG. 3 illustrates this problem. FIG. 3 illustrates the nozzle 330 with the converging section 331, throat region 332, diverging section 333, and axis of flow 334. In the nozzle 330, the flow is along the axis of flow 333 and exits the nozzle 330 as a gas-particle jet 335 before going through a gas impingement region 336 before contacting the substrate 337. The plot 340 depicts the gas velocity 341, particle velocity 342, gas temperature 343, and particle temperature 344 along the axial distance 345 from the inlet of the nozzle 330 to the substrate 337. In the supersonic section of the flow 333, the sonic pressure waves only move in the direction of the flow towards the exit of the nozzle 330. Therefore, any deviation of the flow from the normal operation is not sensible by a sensor that is conveniently placed upstream (before) of the nozzle throat region 332. For material build up to be detected in the diverging section 333, the flow needs to be severely restricted to cause the supersonic flow to become subsonic in the diverging section 333. When this occurs, it is likely that the nozzle 330 has been operating in a non-ideal and faulty manner for some time. This may not be visually obvious when observing the spray process, e.g., the process 120 in FIG. 1, until the process is significantly affected. In cases where wear is occurring in the diverging section 333 (e.g. 221 in FIG. 2), the flow never becomes subsonic immediately downstream of the nozzle throat. The gas mass flow rate does not change, and the pressure waves do not travel upstream of the nozzle throat. Thus, sensors upstream of the nozzle throat 332 do not detect a signal that may indicate a process change in the diverging section 333 of the nozzle 330. Sensors are not placed in the diverging section 333 not to interfere with the compressible gas and particle flow 340. The changes to the nozzle throat 332 are detectable via sensors placed upstream of the nozzle throat. However, clogging and wear often occur in the high particle velocity 342 diverging section 333 of the nozzle.

The resultant coatings under these circumstances, e.g., when clogging and wear occur, are generally poor, and at the very least include inhomogeneities [6]. Clogging often occurs very quickly after initiation and leads to shutdown of cold spray systems mid operation [6, 8]. These shutdowns may be several hours long. Often, when clogging occurs, the deposited material must be removed via machining and the entire coating procedure must be restarted. These are costly occurrences that lower manufacturing rates, increase labor time, and waste material.

The mainstream theories of the causes of nozzle clogging are the high kinetic and thermal energy during the impact of particles on nozzle internal surfaces, and the compatibility of the nozzle and powder materials for generating metal-metal bonds. The three mainstream solutions to prevent clogs are: (1) selecting an appropriate nozzle material that is compatible with the cold spray powder and that reduces compatibility for metallic bonds [6, 8]; (2) cooling the nozzle surface temperature to reduce the total energy (kinetic and thermal) during the interaction of particles with internal nozzle surfaces [9, 10]; and (3) manufacturing of nozzles from softer wearable materials so that they wear slowly rather than causing buildup on internal surfaces of the nozzle [11].

Many companies and researchers are trying to tackle this problem [10]. Cold spray manufacturing companies such as Impact Innovations (Haun, Germany) and Plasma-Giken (Saitama, Japan) use externally water cooled nozzle systems to prevent nozzles from clogging. Thermal conductivity of polymers are very low [12] and, thus, are not used in water cooled nozzle systems. High thermal conductivity and hard materials such as silicon carbide (SiC) and glass (quartz or borosilicate) are used fully or partially on the internal surfaces of water cooled nozzle systems to reduce the internal nozzle wall temperatures [8, 13]. The hard nature of these materials as well as their metallic bond incompatibility makes them attractive. This has been shown to assist in prevention in clogging [10]. However, external water-cooling systems do not eliminate the nozzle clogging problem at high gas temperature operational conditions. As also reported in the work of Cormier et al. [14], spray processing conditions may be limited to subpar conditions for materials that require high gas pressures and temperatures to prevent clogging. Thermoplastic materials are offered by some cold spray system manufacturers [7], e.g., VRC Metal Systems, Rapid City, SD, USA, to be used with low temperature metal powders (e.g. tin and aluminum) to prevent clogging while allowing the nozzles to preferentially wear at slow rates [11]. This method has proven useful; however, it limits the gas operating temperatures at the nozzle inlet to approximately ~430° C. This is a limitation that prevents a popular cold spray powder, aluminum, to be sprayed at high temperatures with the cheaper nitrogen gas to achieve high strength repairs, coatings, and products. The more expensive and rare helium gas is preferred for applications that require high adhesive and cohesive bond strength [1, 15]. In many applications that use nitrogen, gas temperatures are maximized near the glass transition temperature of thermoplastic nozzles. This causes the thermoplastic nozzles to wear rapidly [7], which leads to unpredictable deposition properties. External cooling of thermoplastics and polymers via methods given in [8, 10] is nearly impossible due to the extremely low thermal conductivity of these materials (on the order of 1 W/m-° K).

As such, existing methods for managing nozzle clog and wear are inadequate and there is a need to eliminate nozzle clogging and wear problems to reduce operating cost and increase the applicability of additive manufacturing, e.g., cold spray, technology. Embodiments provide a novel spray nozzle system designed for the prevention of nozzle clogging and wear while achieving high gas operating pressures and temperatures. Furthermore, the novel design of embodiments aerodynamically focuses spray particles to the center of the nozzle to reduce the footprint of the material deposition, increases the resolution of material deposition, and increases the applicability of additive manufacturing technology.

Embodiments provide a nozzle designed to eliminate clogging and wear problems by controlling high nozzle internal surface temperatures and the powder and nozzle surface interactions, which are seen as the main underlying factors of nozzle clogging and wear. In this novel design, coolant gas channels are manufactured on the walls of the spray nozzle. In an embodiment, the channels are manufactured in a way to keep axisymmetric flow. In embodiments, room temperature or lower than room temperature inert gases, such as air, argon, nitrogen ($N_2$) or helium (He), amongst other examples, are injected into in the boundary layer region of the main hot gas/particle flow at controlled flow rates. Controlled rates of dense coolant flow into the flow stream near the nozzle walls generate a cold skin layer along the internal nozzle surfaces and separate the hot gas stream from the nozzle internal surfaces.

Figure 4:
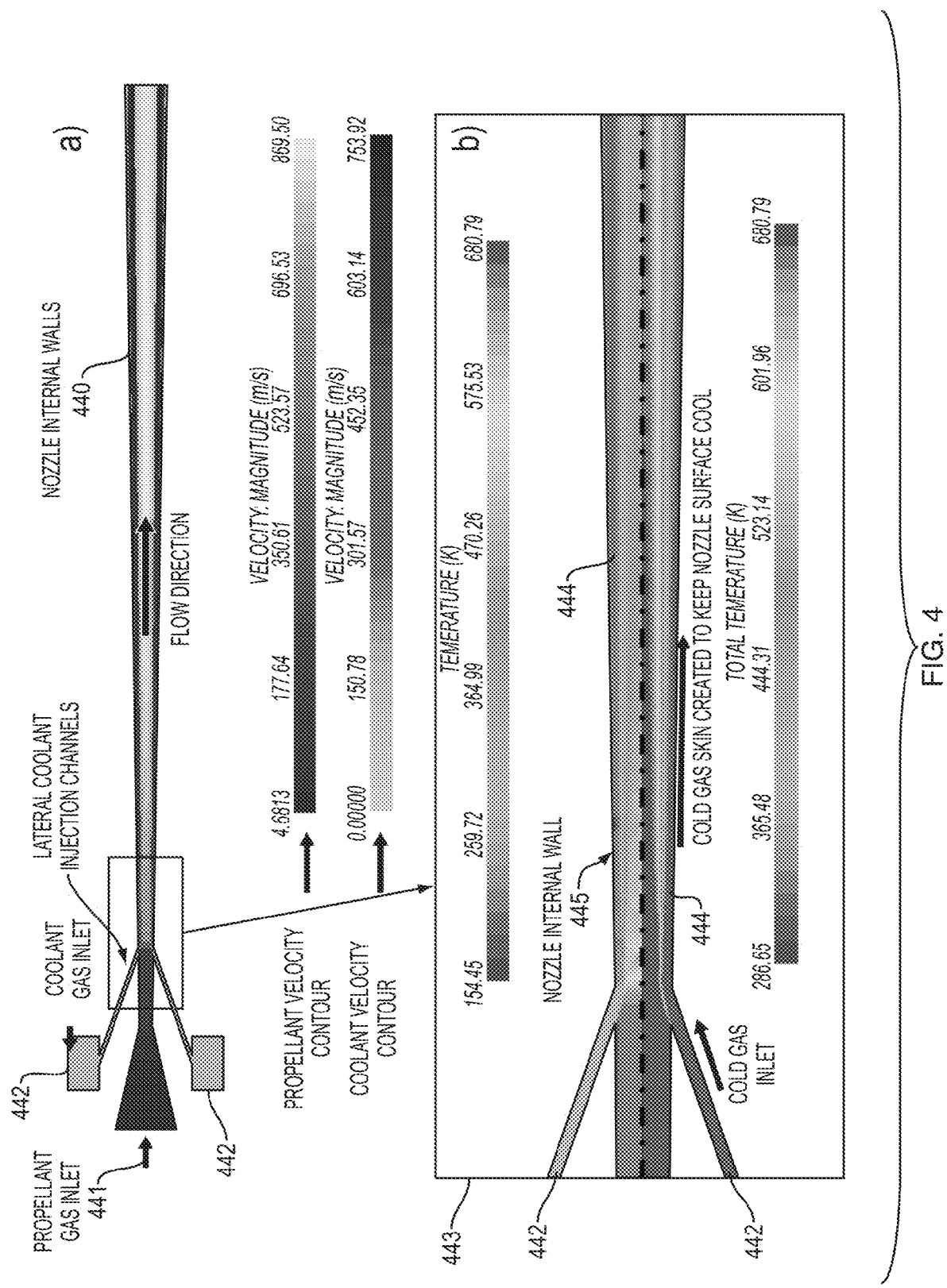
FIG. 4 illustrates computational fluid dynamics simulation results for an embodiment.

FIG. 4 illustrates computational fluid dynamics simulation results for an embodiment of the present invention where the nozzle 440 with propellant gas inlet 441 has one coolant gas inlet that is axially symmetric. Coolant gas 441 is injected around the entire circumference of the propellant gas 441 at the injection site. The expanded view 443 of the nozzle 440 shows that during operation, the cold gas inlet 442 allows the cold gas to enter the nozzle 440 and create a cold gas skin 444 around the entire circumference of the propellant gas along the internal walls 445 of the nozzle 440. In FIG. 4, the auxiliary channel (cold gas inlet 442) wraps cylindrically all the way around the axis and, as such, in the cross-sectional view it appears as two channels. Computational fluid dynamics simulations also provide information on determining the mass flow rate and jacket pressure needed for obtaining a specific outcome such as a desired nozzle internal wall 445 temperature.

Figure 5:
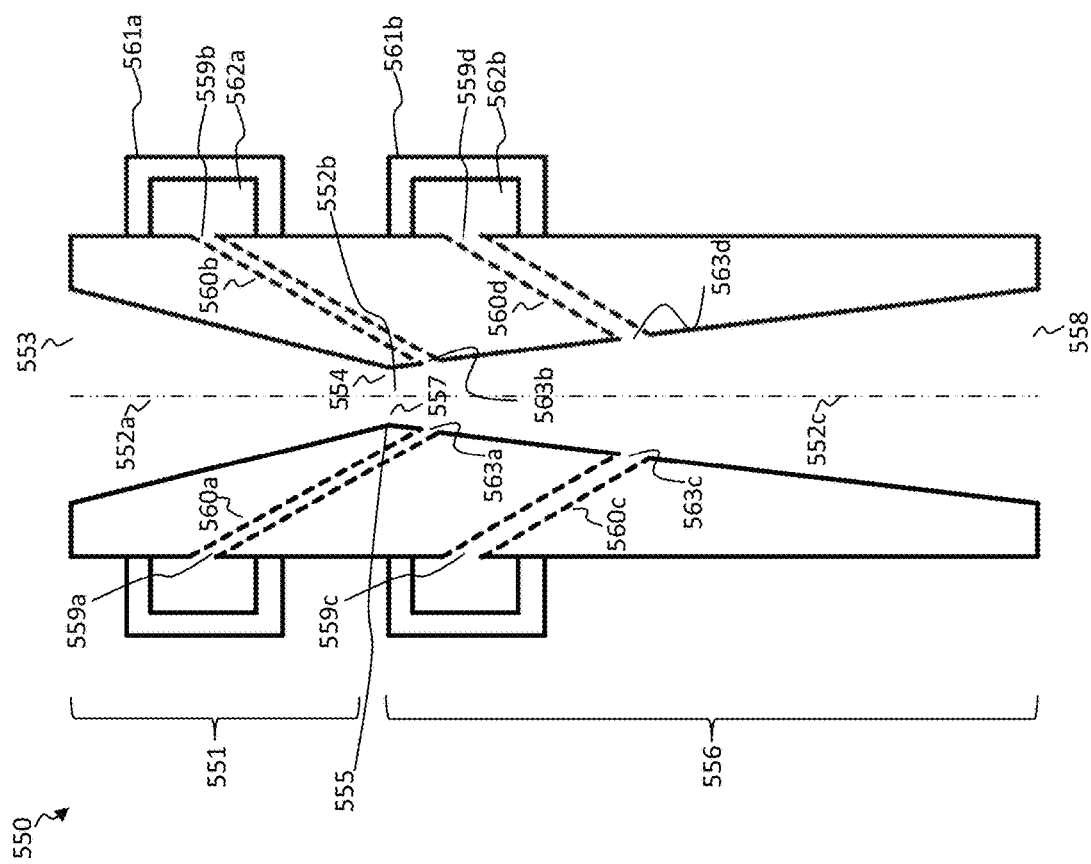
FIG. 5 is a cross-section depiction of an embodiment of a nozzle embodiment.

FIG. 5 is a cut-away view of a nozzle 550 according to an embodiment. The nozzle 550 comprises a converging portion 551 that defines a flow path 552a that decreases in cross-sectional area from an inlet port 553 to a converging portion throat port 554. The nozzle 550 further comprises a throat region 555 that defines a flow path 552b having a cross-sectional area that matches the cross-sectional area of the converging portion throat port 554 and a supersonic portion 556 that defines a flow path 552c to an outlet port 558. The supersonic portion 556 has a supersonic portion throat port 557 with a cross-sectional area matching (or slightly larger than) the cross-sectional area of the throat region 555. The throat portion and the supersonic portion are in full contact. In such an embodiment, the flow paths 552a-c of the converging portion 551, throat region 555, and supersonic portion 556 define a continuous flow path (referred to as 552) from the inlet port 553 to the outlet port 558. In embodiments of the nozzle 550 at least one of the converging portion 551, throat region 555, and supersonic portion 556 define an auxiliary flow path port configured to enable an auxiliary flow to be introduced into the continuous flow path 552. The nozzle 550 is depicted with the flow path ports 559a-d that enable an auxiliary flow to be introduced into the continuous flow path 552 via the channels 560a-d to the injection sites 563a-d.

In embodiments of the nozzle 550, the flow path ports, e.g., 559a-d, may be at any angle in relation to the continuous flow path 552. According to an embodiment, the auxiliary flow path ports 559a-d are at a non-perpendicular angle in relation to the continuous flow path 552. In another embodiment, the cross-sectional areas of the respective flow paths 552a-c have dimensions that accommodate a flow that includes at least one of: particles, a single-phase compressible fluid, and a multi-phase compressible fluid. In yet another embodiment, the auxiliary flow path ports 559a-d have dimensions that accommodate an auxiliary flow that includes at least one of: coolant and particles.

Embodiments of the nozzle 550 may include auxiliary flow path structures, e.g., the channels 560a-d, that define an auxiliary flow path that is fluidically coupled to the auxiliary flow path ports 559a-d. In such an embodiment, the auxiliary flow path structures 560a-d and auxiliary flow path ports 559a-d have respective cross-sectional areas with dimensions that accommodate the auxiliary flow from the ports 559a-d, via the structures 560a-b, to the continuous flow path 552, to be subsonic or supersonic.

In an embodiment, at least one of the converging portion 551, throat region 555, and supersonic portion 556 define a plurality of auxiliary flow path ports symmetrically or asymmetrically arranged about the continuous flow path. Further, yet another embodiment, includes a splitter arranged to cause a flow within the continuous flow path 552 to divide into multiple flow paths. Such an embodiment of the nozzle 550 may also include a reverse auxiliary flow path port arranged to introduce a reverse auxiliary flow into the continuous flow path 552 at the splitter.

An embodiment of the nozzle 550 comprises one or more jackets coupled to the nozzle 550 that form a pressure chamber surrounding the auxiliary flow path port. The nozzle 550 as depicted in FIG. 5 includes the jackets 561a and 561b that form the pressure chambers 562a and 562b surrounding the ports 559a-d. In another embodiment, a pressure chamber may surround two or more auxiliary flow path ports.

The length of the flow path 552c of the supersonic portion 556 has increasing cross-sectional area. In another embodiment, a length (a portion or the entire length) of the flow path 552c of the supersonic portion 556 has constant cross-sectional area, e.g., includes a straight portion. According to yet another embodiment, a length of the flow path 552c of the supersonic portion 556 is curved and an auxiliary flow path port is at the curved length of the flow path 552c of the supersonic portion 556. In embodiments, cross-sectional area of lengths of the supersonic portion 556 may vary depending on desired flow characteristics. For instance, in an embodiment, the diverging section 556 may diverge in a way to either keep sonic flow with auxiliary flow guidance, or increase to achieve supersonic flow, or increase rapidly in cross section first then increase slowly in two setups to first achieve supersonic flow then maintain supersonic flow (straight section). Further, in another embodiment, downstream of the throat 555, the cross-sectional area of the supersonic portion 556 continuously diverges so the cross-sectional area gets larger downstream of the throat 555 so as to achieve a supersonic flow.

In another embodiment of the nozzle 550, a cross-sectional area of the outlet port 557 is configured to accommodate a flow that is 1/10th mm to 100 mm in diameter.

In an embodiment, the nozzle 550 is incorporated into an additive manufacturing, e.g., cold spray, system. Such a system includes a sensor measuring an output flow in the continuous flow path 552 at the outlet port 558 and a controller configured to modify the auxiliary flow in through the ports 559*a-c* based on the output measured by the sensor. In an embodiment, the controller is configured to perform at least one of (1) modifying a path of the flow in the continuous flow path through modifying the auxiliary flow and (2) modifying the auxiliary flow to control at least one of: deposition resolution and the angle of the output flow at the outlet port.

To manufacture embodiments the hole electrostatic discharge machining method is a viable option for manufacturing small sized holes (~0.5 mm) into the sides of the nozzle. Alternatively, laser manufacturing of these holes is a viable option. In embodiments, the channels, e.g., auxiliary ports, serve the purpose of delivering cool gas into the high temperature gas flow stream along the nozzle internal walls.

Figure 6:
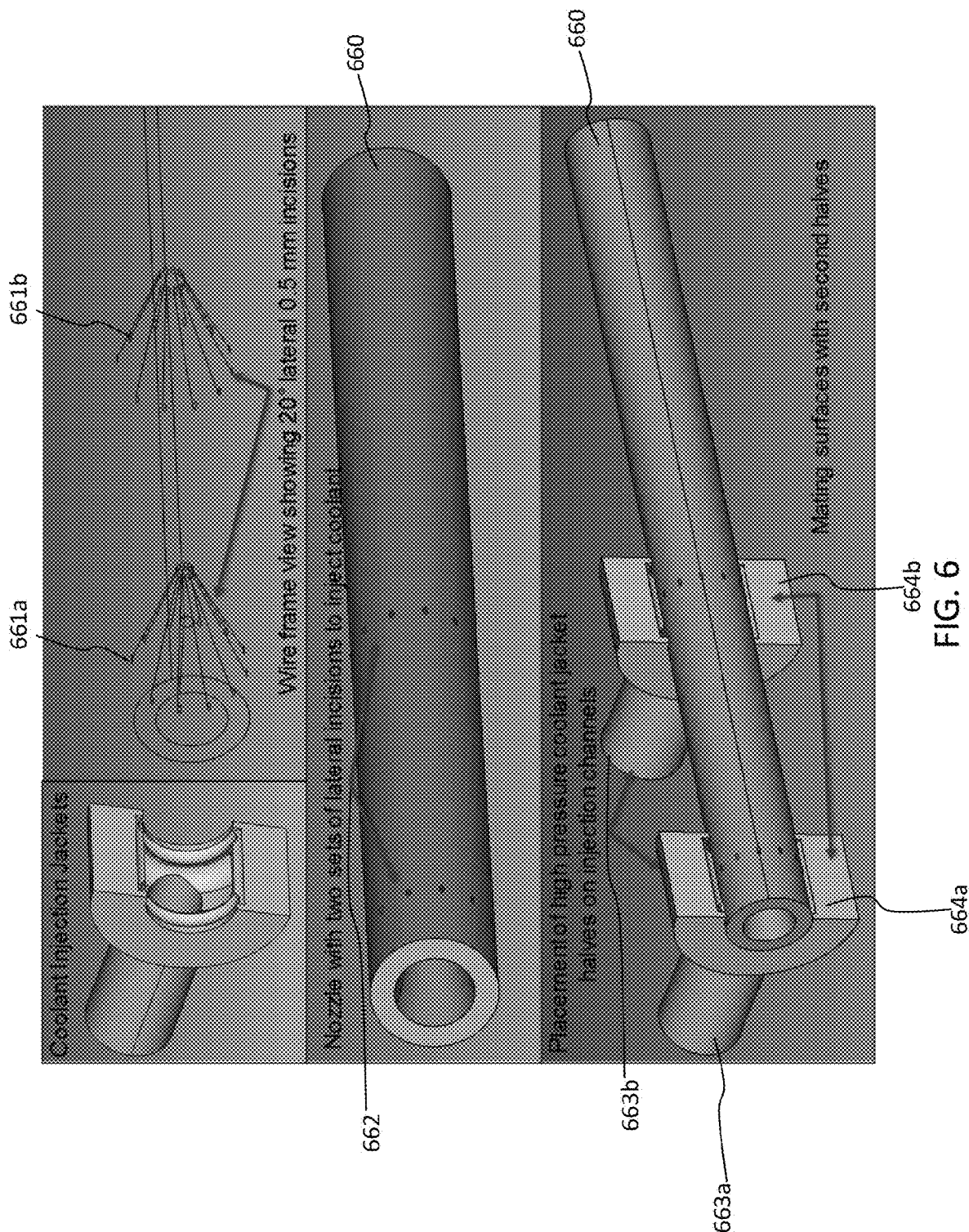
FIG. 6 illustrates a nozzle, components of the nozzle, and auxiliary channels of the nozzle according to an embodiment.

FIG. 6 illustrates a nozzle 660, coolant jackets 663*a-b* of the nozzle 660, and auxiliary channels 661*a-b* of the nozzle 660 according to an embodiment. For the nozzle 660, high pressure cold gas is supplied to the channels 661*a-b*, using two high pressure jacket halves 663*a* and 663*b* with mating surfaces 664*a* and 664*b* that mate to second halves (not shown) with high pressure gaskets that are mounted onto the nozzle 660 by way of bolting them to each other. The two jacket halves can be mounted on a single series of channels, e.g., the channels 661*a*. Each half 663*a* and 663*b* serves half of the channels. A concept sketch of this is depicted in FIG. 6 Error! Reference source not found. for the nozzle 660 with the two sets of 12 channels 661*a* and 661*b* which are shown in the wire frame depiction of the nozzle 660. There may be more than 12 channels depending on the outer diameter of the nozzle 660. The jackets may also be manufactured to encircle the entire row of holes to supply pressure to a single set of auxiliary flow channels 661*a* or 661*b*. The holes 662 which are fluidically coupled to the channels 661*a-b* can be enlarged on the outer nozzle 660 surfaces to ease the flow of gas into the gas main stream and which is also helpful if particles are additionally injected from these ports 662.

Figure 7:
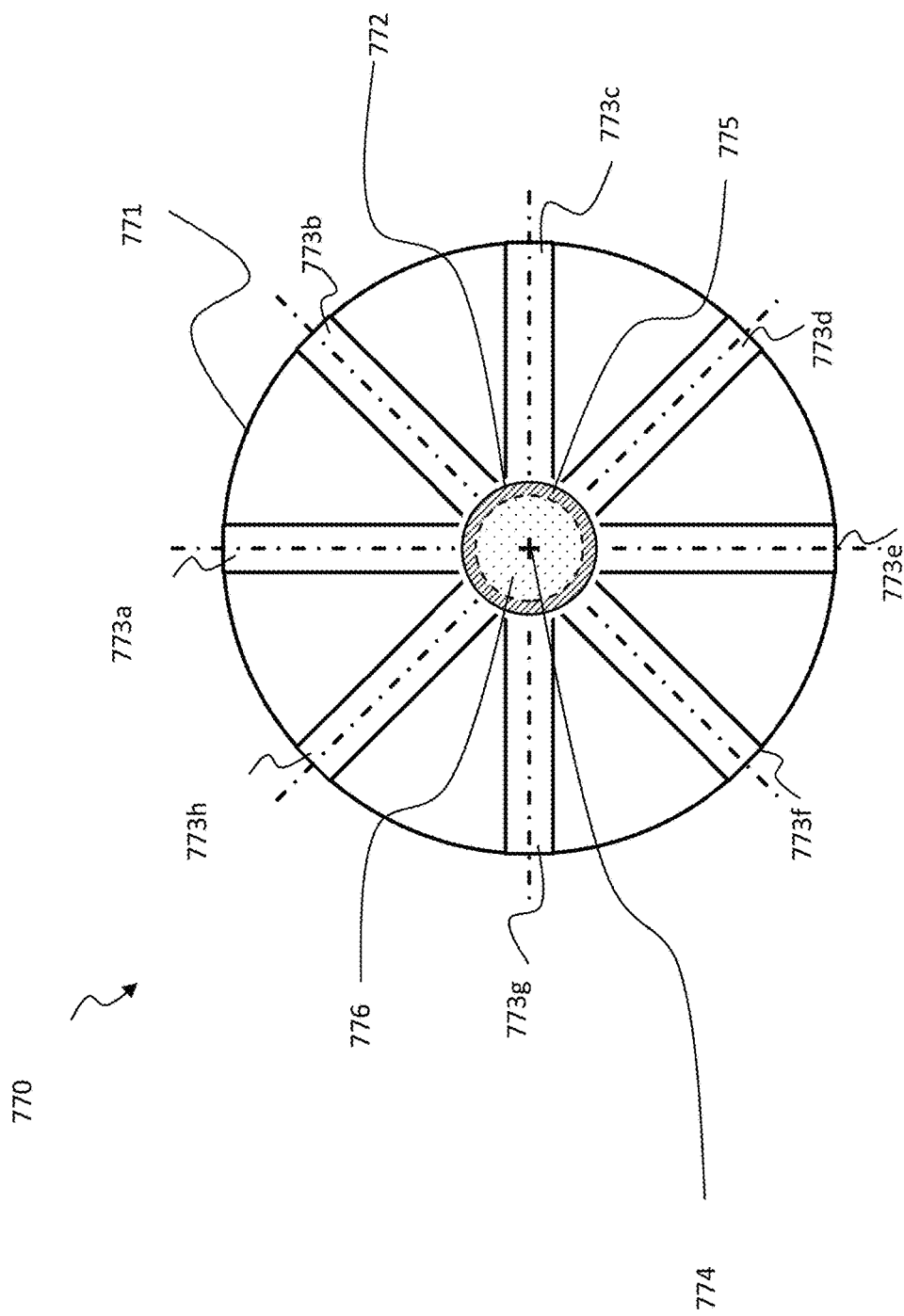
FIG. 7 is simplified cross-sectional depiction of a nozzle according to an embodiment.

FIG. 7 is simplified cross-sectional depiction of a nozzle 770 according to an embodiment. FIG. 7 depicts the nozzle 770 outer wall 771, internal nozzle wall 772, and the nozzle auxiliary channels 773*a-h*. In such an embodiment, the patterning style of the channels 773*a-h* is cylindrical extrusion into the internal wall 772 and can create a full ring of auxiliary flow to the main flow path 774. Controlling the pressure to the channels 773*a-h* facilitates full control of the nozzle 770 internal wall 772 temperature as well as centralizes particulates in the flow path 774. Upon its entry, auxiliary flow stream 775 surrounds the propellant flow stream 776 to coat the entire surface of the internal nozzle wall with a cold gas layer along the continuous flow path 774. Further, it is noted that while the continuous flow path 774 is depicted as having a circular cross-sectional area, embodiments are not so limited and the cross-sectional area of the flow path 774 may be any shape.

Figure 8:
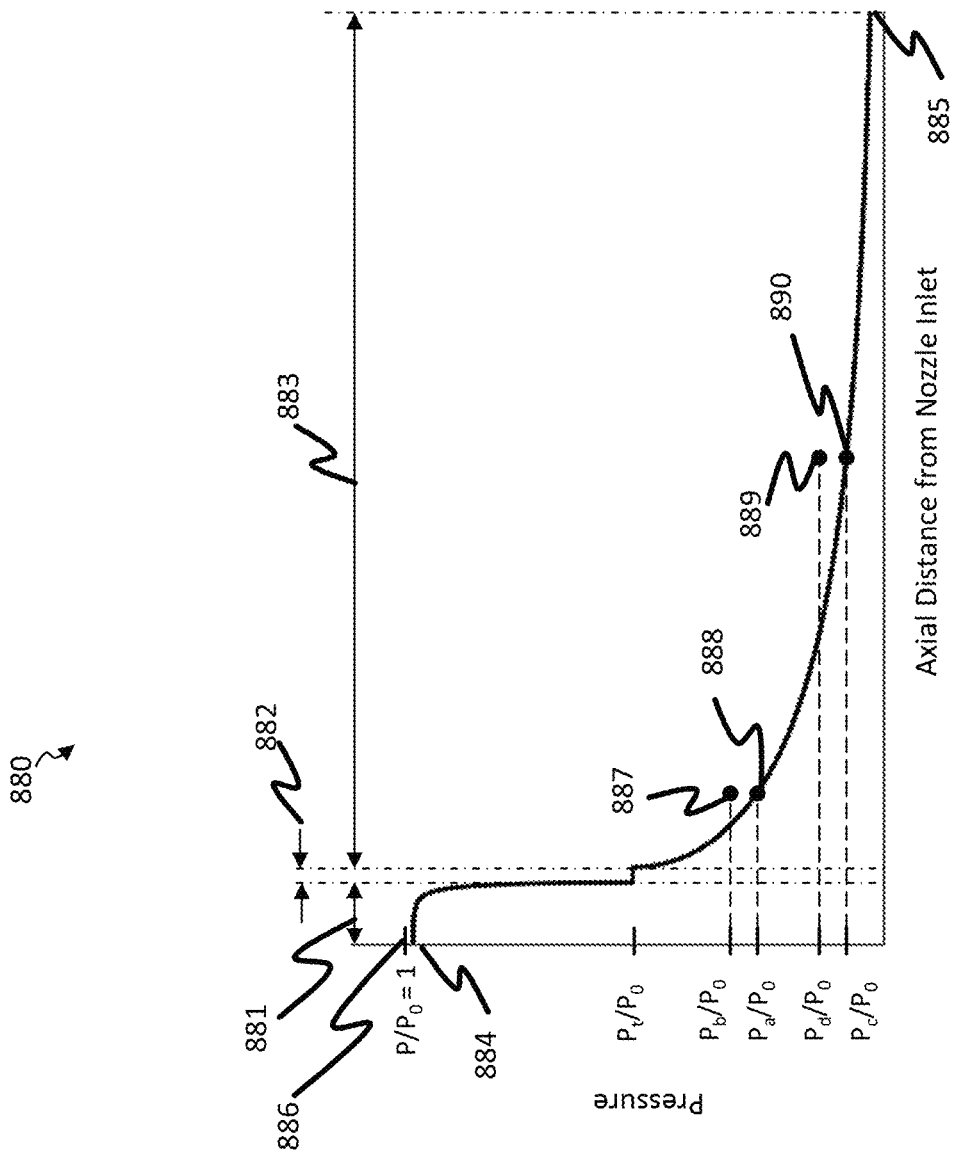
FIG. 8 is a pressure plot showing supply pressure according to an embodiment.
Figure 9:
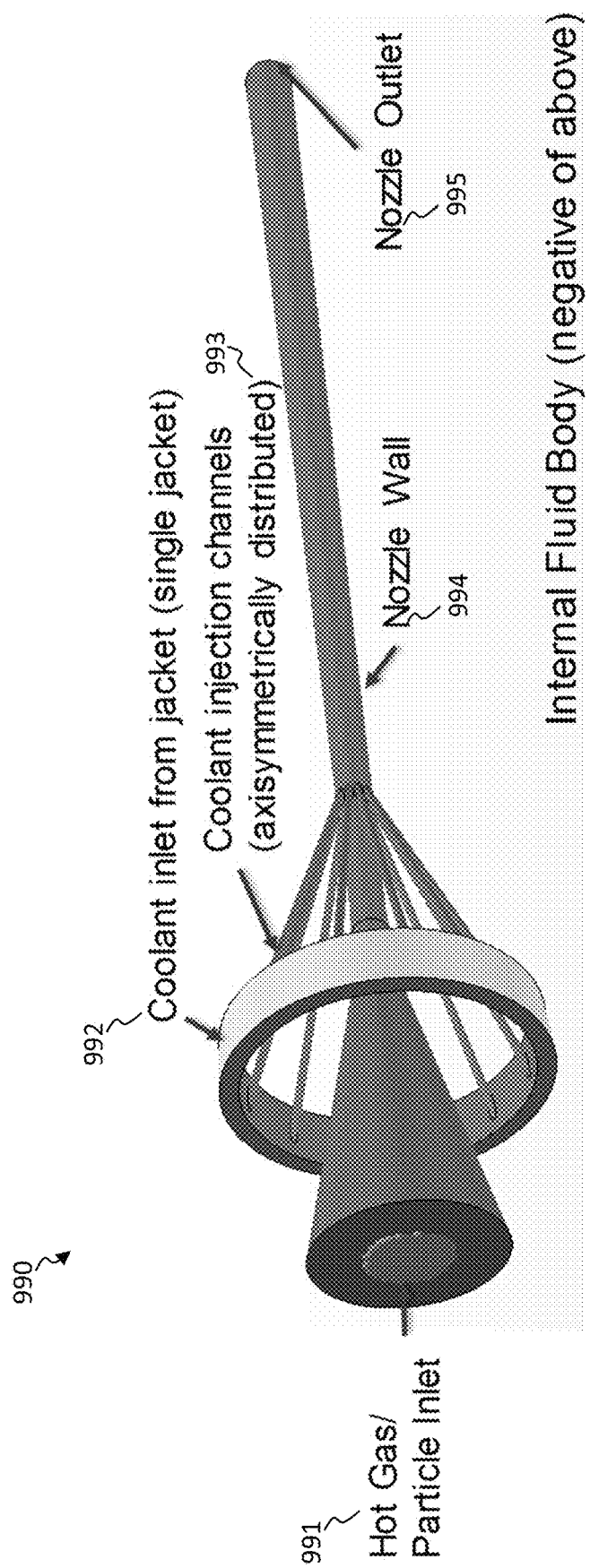
FIG. 9 is a depiction of fluid body in a nozzle embodiment.
Figure 10:
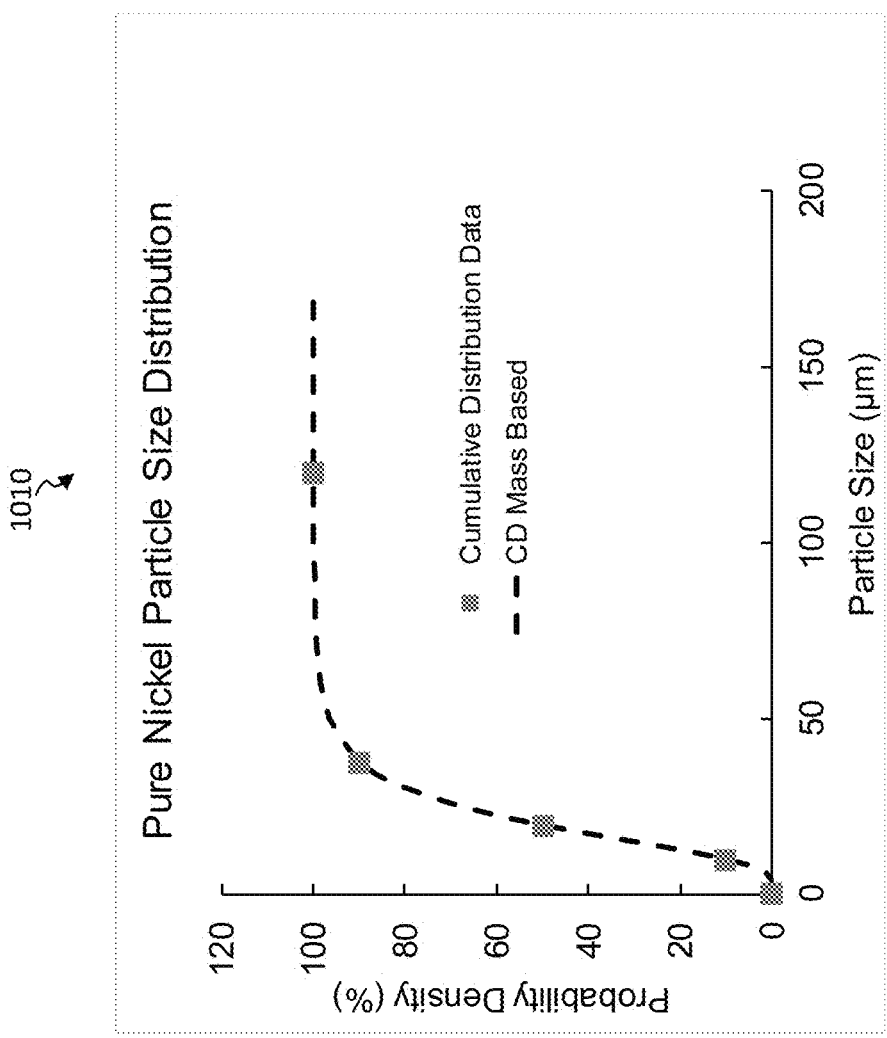
FIG. 10 is a plot showing particle size distribution used in testing embodiments.
Figure 12:
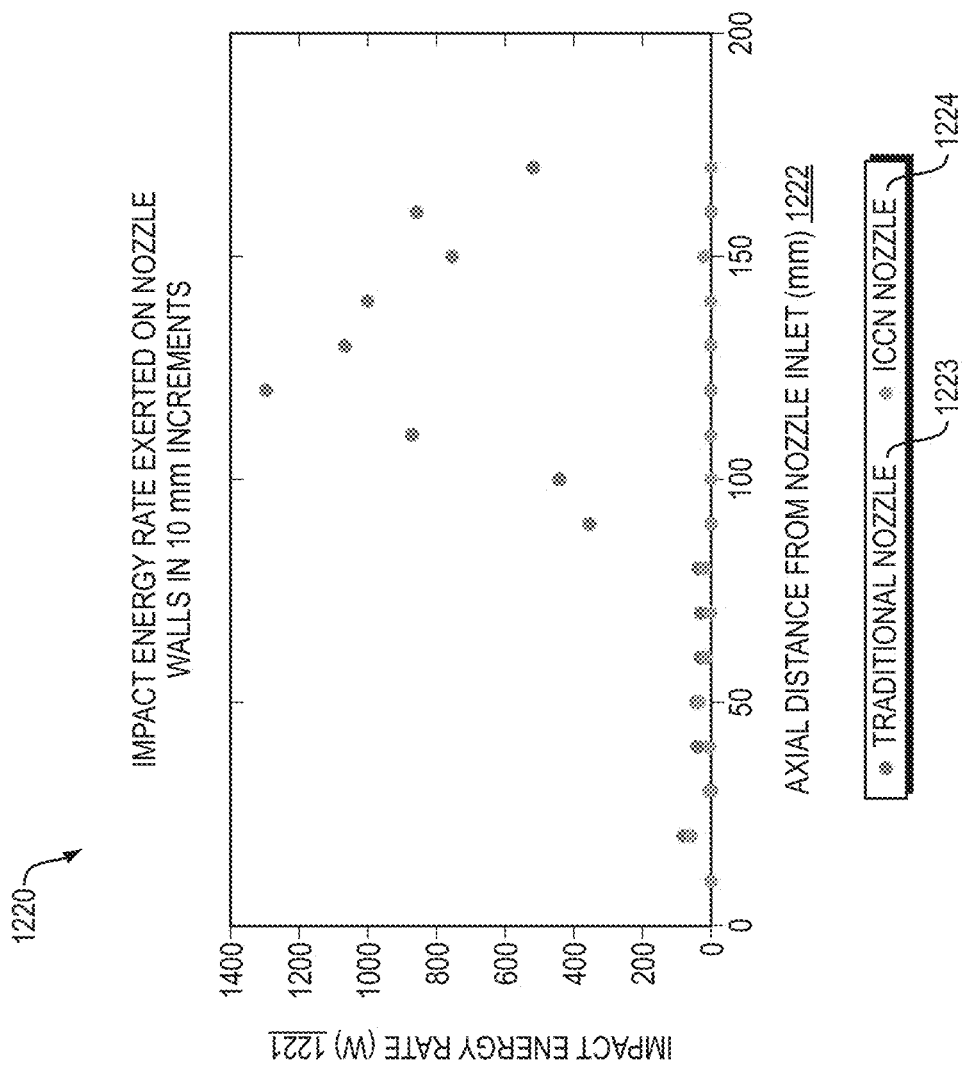
FIG. 12 is a plot depicting particle impact energy rate for a traditional nozzle and a nozzle according to an embodiment.
Figures 13A, 13B:
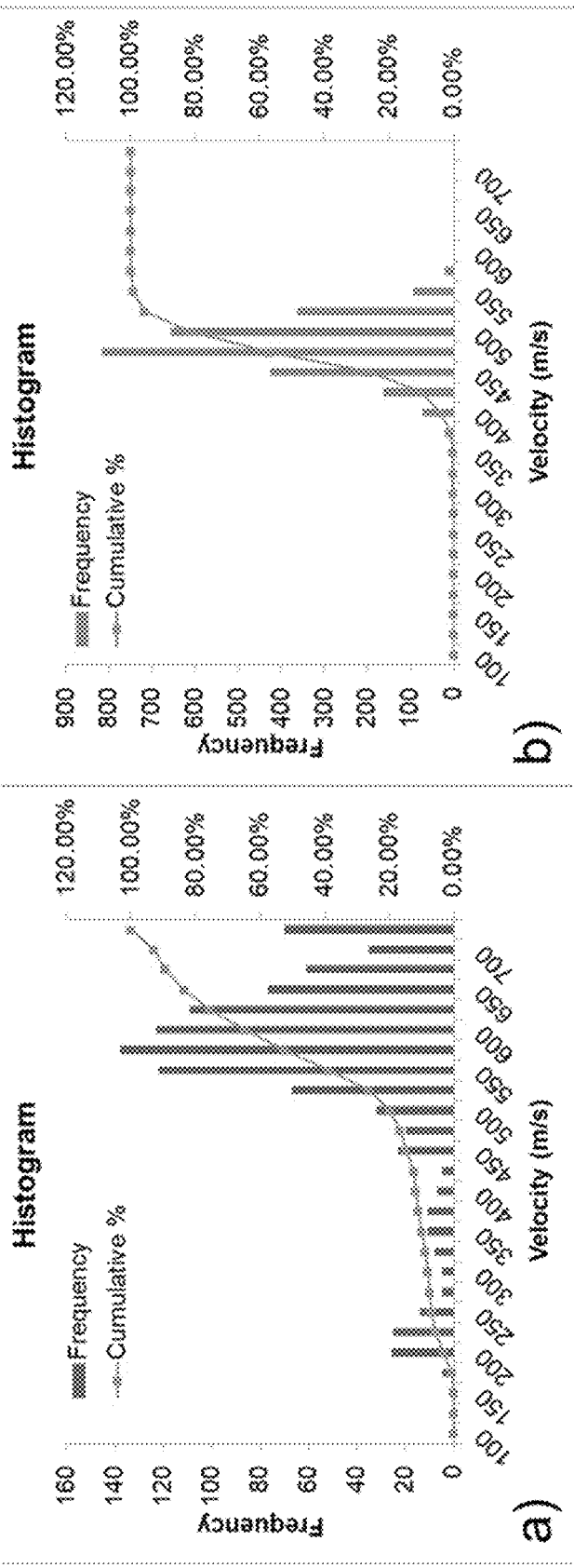
FIG. 13A is a velocity histogram of particles exiting a traditional nozzle.
FIG. 13B is a velocity histogram of particles exiting a nozzle embodiment.

FIG. 8 is a pressure plot 880 that shows pressure variation along a flow path, e.g., the flow path 552*a-c* of FIG. 5. FIG. 8 plots pressure variations for a converging section 881, throat section 882, and diverging section 883 for an embodiment, e.g., the nozzle 550 shown in FIG. 5. The gas pressure from nozzle inlet 553 to nozzle exit 558 drops continuously from near the gas reservoir pressure at inlet 884 to a much lower pressure exit 885, respectively. The gas pressure 885 at nozzle exit 558 can be higher or lower than the atmospheric pressure. The gas supply pressure 886 is significantly higher than the atmospheric pressure to maintain a continuous flow through nozzle 550 along its continuous flow stream.

The plot 880 in FIG. 8. illustrates that pressures along the continuous flow stream 552 change, and pressure in supply jackets 562*a* and 562*b* maintain pressures higher than auxiliary flow injection sites 563*a-d* to maintain a positive flow into the continuous flow stream 552. Pressure supply jacket 562*a* is at a pressure 887 that is higher than the pressure 888 at injection sites 563*a* and 563*b* to maintain a positive flow in channels 560*a* and 560*b*. The difference between jacket pressure 887 and injection site pressure 888 is adjusted to control the auxiliary flow rate through channels 560*a* and 560*b*. This serves several purposes when combined with controlling the angle of auxiliary channels 560*a* and 560*b* and a series of other jacket-channel embodiments (e.g. 562*b* and 559*c-d*): (1) auxiliary gas formation along internal walls of nozzle 550 is controlled to protect nozzle walls from clogging and wear; (2) auxiliary flow path manipulates the sectional flow profile of the continuous flow path 552*a-c* to dynamically change the particle acceleration properties of the continuous flow path; (3) modifying the continuous flow path; and (4) aerodynamically changing the trajectory of particles to either change the direction of the particles or focus them to the center of the continuous flow path 552*a-c* to reduce the footprint of material deposition and increase material print resolution. FIG. 8 further illustrates that gas pressure 880 changes along the continuous flow path 552*a-c* and jackets 562*a*, 562*b*, and any additional jacket-channel combinations have different, but coordinated control mechanisms. Control of the jackets can be simplified using mass flow controllers to maintain the required pressure differences between the jackets 562*a-b* and the auxiliary flow injection sites 563*a-d* as it is physically difficult to integrate pressure sensors inside the continuous flow path 552*a-c*. Mass flow controllers can ensure a positive flow through the auxiliary flow channels 560*a-d*. The continuous flow path 552*a-c* can be measured by a mass flow rate sensor. Ratio of propellant and auxiliary flow rates and jacket pressure (888 and 890) requirements are determined via computational fluid dynamics simulations such as those described herein. Embodiments can utilize values measured by these sensors to control operating conditions of the nozzle.

The effectiveness of embodiments has been verified using computational fluid dynamics simulations. A series of two dimensional and three dimensional computational fluid dynamics simulations were performed to simulate the gas and particulate flow to verify the functionality and test the validity of embodiments. Flow of pure nickel powder was simulated in both a traditional nozzle and a nozzle embodiment of the present invention. In this preliminary study, the internal nozzle wall temperatures, the impact of particles on the internal nozzle walls, and the velocity and temperature conditions of particles exiting the nozzle was examined. The simulations show that embodiments of the present invention significantly reduce nozzle internal wall temperatures, reduce nozzle wall-particle interactions, and have minimal changes on the flight velocity and temperature of particles that are exiting the nozzle.

The traditional nozzle in the simulation had a 2 mm nozzle throat size, a 140 mm diverging section length, and an expansion ratio of 6. The nozzle embodiment of the present invention had internal geometry that is identical, but with the addition of a single set of 12 cooling channels that facilitate injecting nitrogen gas at 10 mm axially downstream of the nozzle throat. In such an embodiment, the cooling channels were 0.5 mm in diameter and were at a 20° angle with respect to the internal walls of the nozzle. The fluid dynamic model domain of the nozzle embodiment of the present invention is depicted in FIG. 9. FIG. 9 illustrates the internal fluid body, i.e., is a negative, of a nozzle embodiment, such as the nozzle 660 in FIG. 6. The fluid body 990 includes the gas and particle inlet 991, the coolant inlet 992 from a single jacket and the coolant injection channels 993. The fluid body 990 also shows the nozzle wall 994 and nozzle outlet 995.

To verify operation of a nozzle embodiment, a simulation was performed where nickel powder particles with a particle size distribution given by the plot 1010 in FIG. 10 were injected into a traditional nozzle and an embodiment of the present invention modeled in a three-dimensional computational fluid dynamics simulation. The propellant gas (process gas) was selected as nitrogen. The nitrogen inlet pressure and temperature conditions were set as 40 bars and 400° C. In the embodiment of the invention, i.e., the internally cooled aerodynamically centralizing nozzle (ICCN), the coolant mass flow rate was set in a way to provide equivalent coolant and propellant gas flows (0.015 kg/s). The appropriate coolant injection rate was determined from a parametric study completed via two-dimensional axially symmetric computational fluid dynamics simulations. Lagrangian particles were injected in a Eulerian domain. The fluid body was simulated using continuity, momentum, and energy equations [16]. The turbulence within the computational domain was calculated using Large Eddy Simulation turbulence models. Particles were transiently injected and traced through the domain. Impacts on the nozzle internal wall boundary and flow conditions as they exit the nozzle at the outlet plane were recorded.

Nozzle internal wall temperatures were estimated via computational fluid dynamics for both traditional and embodiments of the present invention and are shown in the plot 1101 of FIG. 11A (traditional nozzle), 1102 of FIG. 11B (embodiment of the present invention), and 1103 of FIG. 11C. The plot 1101 of FIG. 11A is a contour plot of gas total temperature inside a traditional nozzle. The plot 1102 of FIG. 11B is a contour plot of gas total temperature inside a nozzle embodiment, i.e., an ICCN. The plot 1103 shows the nozzle wall temperature for a traditional nozzle 1104 and a nozzle according to an embodiment 1105. The results 1103 show that the nozzle internal wall temperatures 1105 for the ICCN have dropped drastically downstream of the coolant injection location (the point 1106 in the plot 1103) from a minimum of 300° C. in the traditional nozzle to a maximum of 50° C. in the ICCN. Such a drastic drop in nozzle surface temperature significantly lowers the chance of premature particle deposition inside the nozzle surfaces.

In addition to reducing the nozzle surface temperatures, embodiments have proved very useful in reducing the interactions of particles and the nozzle internal surfaces. To verify this functionality, particle behavior was traced over a 1 ms period of time that equates to the flow of approximately 2500 particles through the nozzle. The total rate of impact energy was traced in 10 mm long sections of both the traditional nozzle and a nozzle embodiment of the present invention. The exposure of the nozzles to impact of particles is plotted in the plot 1220 of FIG. 12 which depicts the impact energy rate 1221 versus the axial distance from the nozzle inlet 1222, for a traditional nozzle 1223 and a nozzle according to an embodiment 1224. The amount of impact energy exerted on the internal surfaces of the nozzle embodiment of the present invention 1224 is a very small fraction of the energy exerted on the internal surfaces of the traditional nozzle 1223. The simulation results show that nozzle embodiments are very effective in significantly reducing the number of particle impacts. As such, embodiments eliminate the chance of erosion or premature particle deposition inside the nozzle that lead to clogging.

While embodiments are effective in reducing the potential of nozzle clogging and erosion, it is important for embodiments to also provide the same level of material deposition performance. To verify this functionality, particle flight conditions at the nozzle exit were examined. Results for a traditional nozzle and nozzle embodiment (ICCN) are shown in Table 1.

TABLE 1

Particle Conditions as the Particles Exit the Nozzle

| | Traditional Nozzle | ICCN |
|---|---|---|
| Radial Location (mm) | 1.33 | 1.38 |
| Std. Dev. (mm) | 0.78 | 0.86 |
| Exit Velocity (m/s) | 465.78 | 468.34 |
| Std. Dev. (m/s) | 59.92 | 35.06 |
| Exit Temperature (° C.) | 266.66 | 252.51 |
| Std. Dev. (° C.) | 26.25 | 28.95 |

Table 1 shows that the average radial location of particles (distance from central axis of nozzle) at the exit for both nozzles are similar. Both nozzles also produce a similar average particle velocity. However, the ICCN produces a small variance in particle velocity. This is a positive improvement as to providing a more homogeneous deposition process by keeping the particle velocities more consistent. The nozzle exit temperatures of particles were slightly lower for the ICCN, in comparison to the traditional nozzle. The temperature difference is minor, and both nozzles produce very similar particle temperature standard deviations. The radial locations and particle temperatures from the traditional and ICCN produced very similar results for 2500 particles that were tracked.

FIGS. 13A and 13B are velocity histogram plots 1331 and 1332 of particle flight velocities through the exit plane for a traditional nozzle (the plot 1331) and a nozzle embodiment (the plot 1332). FIGS. 13A and 13B show that particle flight velocities through the exit plane in both cases produce very different histograms. The traditional nozzle (results shown in the plot 1331 of FIG. 13A) produced very low and very high particle flight velocities with a large standard deviation, while its average was close to the ICCN. The ICCN (results shown in the plot 1332 of FIG. 13B) produced a small standard deviation and the velocity distribution is very narrow. This is likely due to the excessive particle impacts that occur inside a traditional nozzle. The ICCN on the other hand experienced very few particle impacts on its nozzle walls, which allowed particles to reach their maximum potential velocities. Furthermore, the ICCN can allow much higher gas temperatures without clogging or wear complications to accelerate the particles to higher velocities with a narrower distribution. This provides both high velocity particle impact conditions and provides a homogeneous deposition formation.

Figure 14:
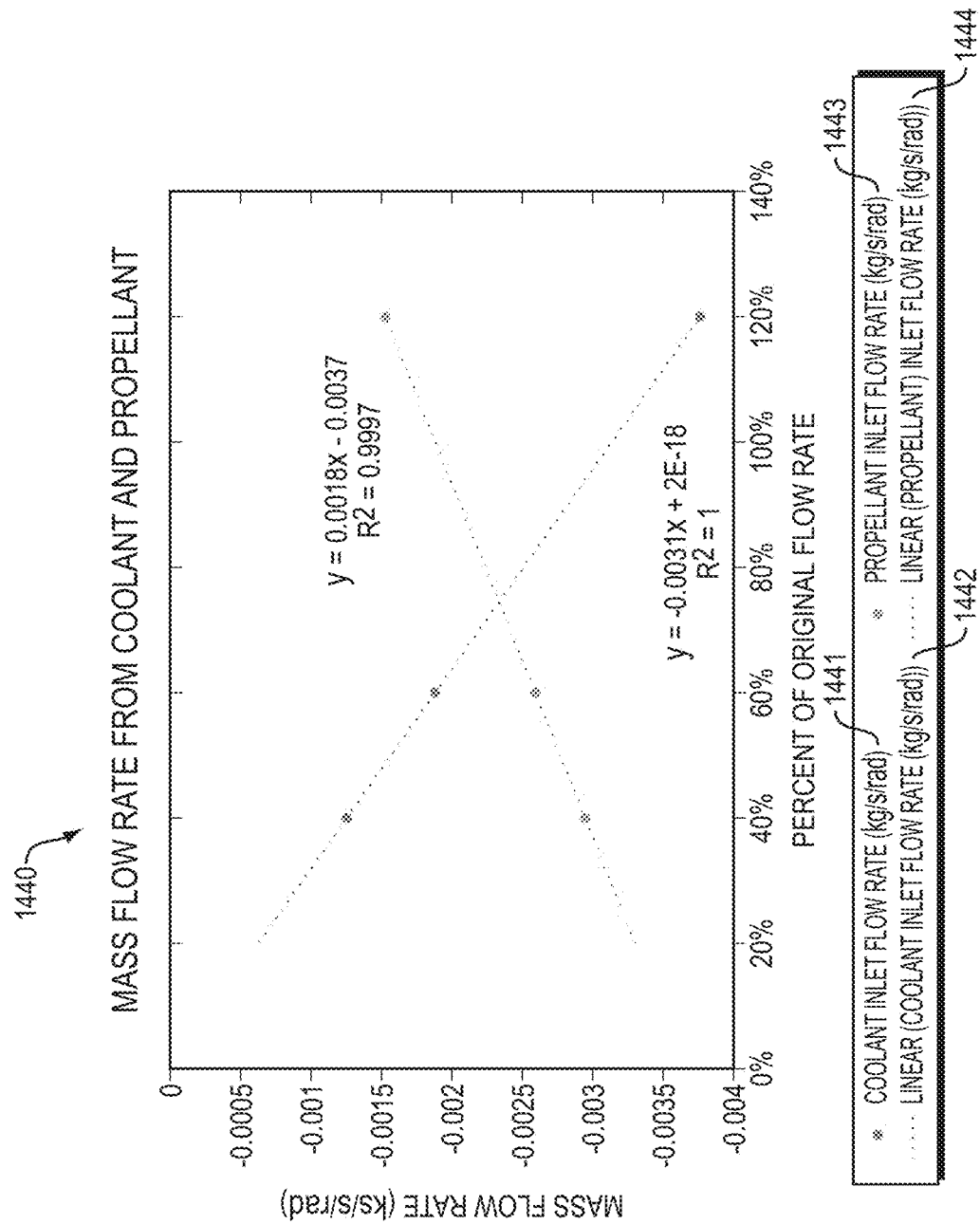
FIG. 14 is a plot illustrating mass flow rate of coolant and propellant in an embodiment.

FIG. 14 is plot 1440 showing coolant inlet flow rate 1441 and linear function fit to the coolant flow rate 1442 used in operating a nozzle embodiment. The plot 1440 also shows the propellant inlet flow rate 1443 and linear function fit to the propellant flow rate 1444. The plot 1440 shows that a single jacket type cooling requires near equivalent propellant and coolant mass flow rates to blanket the entire nozzle. Moreover, in embodiments, multiple jackets with lower flow rates can be employed so as to be less intrusive to the central flow while providing similar effects. Embodiments can also centralize particles in the central flow through coolant injection. Further, coolant injection near the nozzle throat can control effective orifice size. In this way, an embodiment can dynamically change the effective orifice size by increasing/decreasing coolant injection rate near the nozzle throat. This provides greater control over gas/particle flow conditions. Moreover, in embodiments, some of the injection jackets can provide hot gas to centralize particles rather than to cool the nozzle and particles. Further, in an embodiment, the injection location and injection rate can be controlled to centralize particles and produce small footprint depositions for additive manufacturing as well as electronics applications.

Figure 15A:
FIG. 15A depicts particle flow behavior in a traditional nozzle.
Figure 15B:
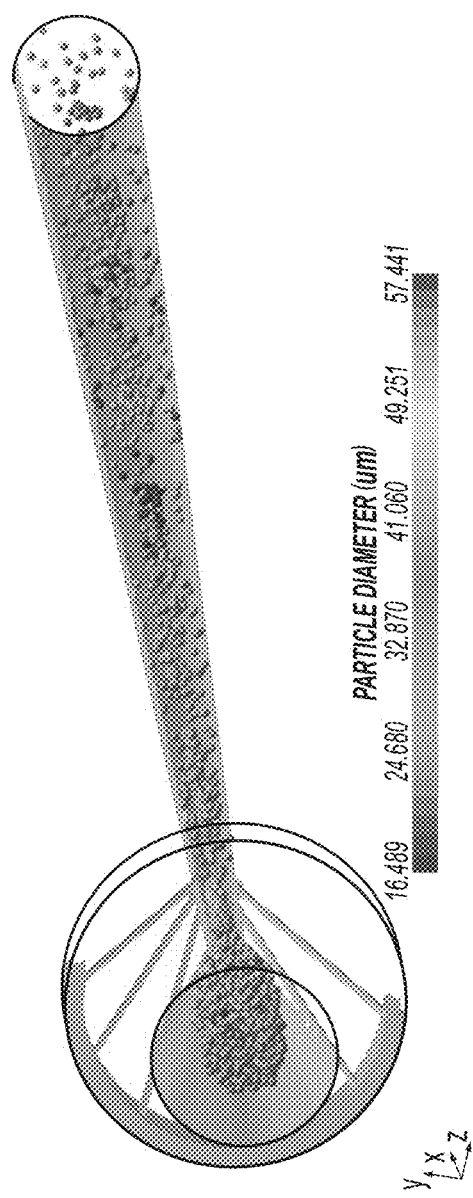
FIG. 15B depicts particle flow behavior in an embodiment.

FIG. 15A and FIG. 15B are snapshots from videos of computational fluid dynamics simulations of particle flow behavior for a traditional nozzle, FIG. 15A, and a ICCN embodiment FIG. 15B. The simulations show that the dispersion of particles downstream of auxiliary flow injection sites did not alter significantly when FIG. 15A and FIG. 15B are compared. Particles are visible near nozzle internal walls in both model results. However, when particle wall impacts are recorded over the same period of simulation, it is found that the embodiment with auxiliary flow injection (FIG. 15B) has significantly reduced particle impacts on nozzle walls, as shown by the plot 1220 of FIG. 12. This means that particles that have a trajectory towards nozzle internal walls are diverted away by the auxiliary flow generated along the internal nozzle walls as shown in FIG. 15B. The small number of particles that impact the nozzle internal walls in an embodiment with auxiliary flow channels, FIG. 15B, experience much lower nozzle internal wall temperatures in comparison to the large number particles that impact the internal walls of a traditional nozzle (FIG. 15A). Thus, the embodiment with auxiliary flow channels, FIG. 15B, significantly reduces the chance of nozzle wear and clogging in comparison to a traditional nozzle.

Embodiments may utilize any propellant gas known in the art. For instance, the propellant may be a single-phase compressible fluid (e.g., nitrogen gas) or a mixture of gases (e.g., a mixed ratio of air-helium or nitrogen-helium), amongst other examples. Further, embodiments may use any gas in the gas inlets, i.e., the auxiliary ports/channels for cooling the nozzle and controlling particle flow. For example, embodiments may use argon as auxiliary flow. Argon may prove advantageous in slowing particle impacts on nozzle internal walls due to its higher density and capacity to slow particles.

In embodiments, the axisymmetrically, i.e., symmetric about the axis of flow, injected coolant stream flow rate can be controlled in a way to centralize the particles that are diverging from the central axis of the flow. A single or multiple coolant injection location points along the axis of the flow can be implemented to aerodynamically align the particles close to the central axis of the flow. The coolant injection rates and the number of sets of coolant injectors can be determined according to the gas process conditions as well as the powder properties. In nozzles that experience clogging in the converging and throat regions of the nozzles, coolant injection may be positioned at all convergent, throat, and divergent regions of embodiments of the nozzle.

Embodiments are superior to existing nozzles for several reasons. Embodiments produce very low internal nozzle temperatures where high velocity particles will come in contact with the nozzle wall. Embodiments keep particulates away from the nozzle internal surfaces by aerodynamically forcing particles towards the center of the nozzle. Further, embodiments provide the capability to aerodynamically centralize particles to produce small footprint depositions to allow cold spray users to build three-dimensional (3D) structures with high resolution. This allows embodiments to build smaller structures and components. Moreover, embodiments provide the capability to control (choke) the hot gas flow by injecting more or less gas at a desired location. This gives more dynamic control over propellant gas flow inside the nozzle and more dynamic control on the particle flow conditions.

The computational fluid dynamics simulations show that embodiments perform well in both (i) keeping nozzle internal wall surfaces cool and (ii) drastically reducing particle-nozzle interactions by forcing particles away from the nozzle walls. Hence, embodiments provide a viable and realistic option to resolve clogging and wear problems experienced in the deposition of a number of materials including nickel, titanium, and aluminum [6]. The ICCN design has from an analytical standpoint proven to (1) produce very low internal nozzle temperatures where high velocity particles will come in contact with the nozzle wall and (2) keep particulates away from the nozzle internal surfaces by aerodynamically forcing particles towards the center of the nozzle. This finding also shows that embodiments can focus particles to the center of the jet stream for small footprint depositions.

Embodiments can also be used at high temperatures while depositing materials that have proven to be difficult in the cold spray field [6]. Embodiments also aerodynamically centralize particles to produce small footprint depositions that allow cold spray users to build 3D structures with high resolution. This allows for additively manufacturing smaller cold spray deposited structures and components. Further, in embodiments the coolant channels can be enlarged slightly to additionally serve as injection channels for powder, i.e., particle, materials.

An example embodiment of the present invention is a nozzle that alleviates nozzle clogging and wear problems. This is achieved by injecting a cold gas stream laterally into the high velocity gas and high velocity particle region of the nozzle. The cold gas stream is injected in a way to cover the inside of the nozzle and separate the high total temperature gas from the nozzle walls. This prevents the nozzle from heating up. Furthermore, the flow of the cold gas stream aerodynamically prevents particles from reaching the nozzle's internal walls to cause any unwanted material buildup or wear. Another purpose of this design is to adjust the coolant injection to push particles to the center of the nozzle. This is useful for reducing the footprint of deposited material. The small footprint that can be achieved by embodiments is very useful for 3D printing parts, e.g., metal components, using cold spray and enables new realms of research and application. Yet another purpose of embodiments is to restrict the hot gas flow aerodynamically to control the flow geometry of the propellant gas dynamically. This gives cold spray users additional control over how particles are accelerated without having to change a given nozzle to a different nozzle.

An embodiment achieves this functionality through use of incisions into side walls of the nozzle to inject cold gas for keeping nozzles cool. Another embodiment employs control cooling gas to prevent particles from impacting on nozzle walls. Yet another embodiment provides the capability to control coolant gas injection to aerodynamically centralize the particles for small footprint deposition for additive manufacturing and 3D printing of components. Further still, an embodiment provides the capability to additionally control the hot gas flow by injecting more or less gas at a desired location. This provides more dynamic control over propellant gas flow inside the nozzle and on the particle flow conditions.

Embodiments provide a multitude of advantages. For instance, internal nozzle temperatures achieved by an embodiment of the invention have not been achieved by any other cold spray nozzle designs. The design of embodiments not only cools the nozzle, but also prevents the nozzle from heating up at all. In addition to nozzle cooling, embodiments keep particulates that are flowing inside the nozzle from contacting the nozzle internal surfaces to prevent wear and potential unwanted material deposition inside the nozzle. This is a substantial modification to current designs. Embodiments also centralize particles to produce small footprint depositions that allow cold spray users to build 3D structures. Moreover, embodiments provide in-situ or live control over effective nozzle geometry which allows control over the particle flow conditions, and effectively provides more control over properties of a component that are being manufactured by cold spray. In an embodiment, this is achieved by actively adjusting auxiliary gas flow rate to increase and decrease the cross-sectional area occupied by the propellant gas in the continuous flow path. The propellant cross-sectional area and its variation along the continuous flow path defines the gas dynamics and, thus, the particle motion. Single or multiple auxiliary flow paths can be adopted to dynamically change gas and particle flow conditions to suit a specific application. Such an embodiment advantageously reduces the number of nozzles that may be needed for different applications and provides flexibility in dynamic nozzle geometry adjustment during a spray operation.

An embodiment of the nozzle allows short and long cold spray operations to continue without interruptions and produces homogeneous and repeatable products. Embodiments also allow the manufacturing of hard-to-deposit materials by allowing higher process temperatures to be used. Furthermore, embodiments are ideal for 3D manufacturing of metal components.

The design and advantages of embodiments enable cold spray systems to produce coatings and components that were previously very problematic. Applications for embodiments exist across many industries including military equipment, biomedical applications, electronics, and manufacturing, amongst others. Embodiments allow reduction to the spot size of cold spray material buildup. This is useful for increasing resolution while 3D printing metal parts, and allows manufacturing of smaller components. Nozzles can also be used in high temperature thermal spray applications to keep thermal spray nozzles for keeping components cool from wearing or clogging. Embodiments can be used to improve spray nozzles in the high temperature thermal spray industry that is primarily used for manufacturing coatings in aerospace.

An embodiment of the present invention is directed to a nozzle comprising a converging portion that defines a flow path that decreases in cross-sectional area from an inlet port to a converging portion throat port. The nozzle further comprises a throat region that defines a flow path having a cross-sectional area that matches the cross-sectional area of the converging portion throat port. Further, the nozzle includes a supersonic portion that defines a flow path to an outlet port. The supersonic portion has a supersonic portion throat port with a cross-sectional area that matches the cross-sectional area of the throat region or is slightly larger than the cross-sectional area of the throat region. In such an embodiment, the flow paths of the converging portion, the throat region, and the supersonic portion define a continuous flow path from the inlet port to the outlet port and the diverging portion of the flow define a series of auxiliary flow path ports configured to enable auxiliary flow streams to be introduced into the continuous flow path. An auxiliary flow path port includes a pressure supply jacket and a series of symmetrically oriented low angle auxiliary flow channels. In an embodiment, during operation, three to five auxiliary flow ports are introduced into the diverging portion of the flow path. An example embodiment has flow channels that are oriented axisymmetrically to introduce a cold auxiliary flow stream concentric to the central propellant flow stream in the continuous flow path similar to that depicted in FIG. 7. Multiple auxiliary flow streams can provide advantages over a single auxiliary flow stream. For instance, auxiliary flow streams do not have to be as strong to create a cold gas skin layer along the entire nozzle wall surface. The smaller cold gas skin layer generated by the first auxiliary flow path is replenished by the subsequent auxiliary flow paths. Such an embodiment keeps the nozzle internal walls cool and reduces the likelihood of wear and corrosion. Auxiliary flow streams have directionality toward the center of the continuous flow path upon their injection into the continuous flow path. The directionality of the auxiliary flow forces particles that are approaching the nozzle internal walls or traveling near the nozzle internal walls to be redirected to the center of the continuous flow path. Multiple auxiliary flow paths repeat this motion along the entirety of the length of the continuous flow path to incrementally center particles. Incremental redirection of particles toward the center of the stream prevents particles from being pushed towards the opposite wall by a single stronger auxiliary flow path. The centralized particles can then form a small diameter footprint deposition for high resolution 3D printing to produce components with higher levels of intricacy. Multiple auxiliary flow paths allow more flexibility to modify the cross-sectional area occupied by the propellant gas stream (776 in FIG. 7) at different locations along the continuous flow path to effectively change the particle acceleration characteristics of the propellant gas to suit needs. When multiple auxiliary flow paths are used, the cold auxiliary gas along the nozzle internal walls is denser and slower than the hot expanded propellant gas. The cross-sectional area occupied by the auxiliary flow path 775 (FIG. 7) is appropriately adjusted to not only move the particles toward the center of the continuous flow path, but also to serve as a buffer zone to slow or stop the impact of particles on the nozzle internal walls. This effect is seen in the computational fluid dynamics results described herein.

REFERENCES

[1] C. A. Widener et al., "Application of High-Pressure Cold Spray for an Internal Bore Repair of a Navy Valve Actuator," *J. Therm. Spray Technol.*, vol. 25, no. 1-2, pp. 193-201, 2015.
[2] V. Champagne, "The Repair of Magnesium Rotorcraft Components by Cold Spray," *Journal of Failure Analysis and Prevention*, vol. 8, pp. 164-175, 2008.
[3] V. K. Champagne and D. J. Helfritch, "A Demonstration of the Antimicrobial Effectiveness of Various Copper Surfaces," *Journal of Biological Engineering*, vol. 7, p. 8, 2013.
[4] S. Camilleri, "On Demand High Volume 3D Metal Printing," in *Cold Spray Action Team Meeting*, Boston, Mass., USA, 2017: U.S. Army Research Laboratory.
[5] V. S. Bhattiprolu, K. W. Johnson, O. C. Ozdemir, and G. A. Crawford, "Influence of Feedstock Powder and Cold Spray Processing Parameters on Microstructure and Mechanical Properties of Ti-6A1-4V," *Surf Coat. Technol.*, vol. 335, 2018.
[6] M. Siopis, A. Nardi, A. Espinal, L. Binek, and T. Landry, "Study of Nozzle Clogging During Cold Spray," in *Cold Spray Action Team Meeting*, Boston, Mass., USA, 2017, Online: Cold Spray Action Team, 2017.
[7] O. C. Ozdemir and C. A. Widener, "Influence of Powder Injection Parameters in High-Pressure Cold Spray," *J. Therm. Spray Technol.*, journal article vol. 26, no. 7, pp. 1411-1422, Aug. 4, 2017.
[8] H. Fukanuma, "Cold-Spray Nozzle and Cold-Spray Device using Cold-Spray Nozzle," U.S. Pat. No. 9,095,858 B2 Aug. 4, 2015.
[9] H. Fukanuma, "Cold Spray Gun," U.S. Patent Publication No. 2013/0087633 A1, Apr. 11, 2013.
[10] X. Wang, B. Zhang, J. Live, and S. Yin, "Investigation on the Clogging Behavior and Additional Wall Cooling for the Axial-Injection Cold Spray Nozzle," *J. Therm. Spray Technol.*, journal article vol. 24, no. 4, pp. 696-701, Apr. 1, 2015.
[11] J. D. Haynes and S. A. Sanders, "Cold Spray Nozzle Design," USA patent application Ser. No. 10/401,427, 2004.
[12] X. Xu, J. Chen, J. Zhou, and B. Li, "Thermal Conductivity of Polymers and Their Nanocomposites," *Adv. Mater.*, vol. 30, no. 17, pp. n/a-n/a, 2018.
[13] D. Cruz, M. Á. Garrido, Á. Rico, C. J. Múnez, and P. Poza, "Wear resistance of cold sprayed Al alloys for aeronautical repairs," *Surf Eng.*, vol. 35, no. 4, pp. 295-303, 2019.
[14] Y. Cormier, P. Dupuis, B. Jodoin, and A. Corbeil, "Pyramidal Fin Arrays Performance using Streamwise Anisotropic Materials by Cold Spray Additive Manufacturing," *J. Therm. Spray Technol.*, vol. 25, no. 1-2, pp. 170-182, 201.
[15] O. C. Ozdemir, C. A. Widener, D. Helfritch, and F. Delfanian, "Estimating the Effect of Helium and Nitrogen Mixing on Deposition Efficiency in Cold Spray," *J. Therm. Spray Technol.*, vol. 25, no. 4, pp. 660-671, 2016.
[16] R. B. Bird, W. E. Stewart, and E. N. Lightfoot, *Transport Phenomena*, 2 ed. New York: John Wiley and Sons, Inc, 2002.

The invention claimed is:
1. A nozzle, comprising:
a converging portion that defines a flow path that decreases in cross-sectional area from an inlet port to a converging portion throat port;
a throat region that defines a flow path having a cross-sectional area that matches the cross-sectional area of the converging portion throat port;
a supersonic portion that defines a flow path, having a supersonic portion throat port with cross-sectional area matching the cross-sectional area of the throat region, to an outlet port;
wherein the flow paths of converging portion, throat region, and supersonic portion define a continuous flow path through the nozzle from the inlet port to the outlet port and wherein at least one of the converging portion, throat region, and supersonic portion defines four or more auxiliary flow path ports symmetrically arranged with respect to a center of the continuous flow path, on an outer wall of the nozzle, configured to enable multiple auxiliary coolant gas flows to be introduced into the continuous flow path through the nozzle;
a jacket coupled to the nozzle forming a pressure-controllable chamber surrounding the four or more auxiliary flow path ports, wherein a given wall of the pressure-controllable chamber is the outer wall of the nozzle; and
a mass flow controller configured to regulate pressure in the chamber to cause the auxiliary coolant gas flows to aerodynamically focus particle flow in the continuous flow path toward the center of the continuous flow path.
2. The nozzle of claim 1 wherein at least one auxiliary flow path port is configured to introduce a flow that is at a non-perpendicular angle in relation to the continuous flow path.
3. The nozzle of claim 1 wherein the cross-sectional areas of the flow paths of the converging portion, the throat region, and the supersonic portion have dimensions that accommodate a flow that includes at least one of: particles, a single-phase compressible fluid, and a multi-phase compressible fluid.
4. The nozzle of claim 1 wherein at least one auxiliary flow path port has dimensions that accommodate an auxiliary flow that includes particles.
5. The nozzle of claim 1 further comprising an auxiliary flow path structure that defines an auxiliary flow path fluidically coupled to at least one auxiliary flow path port, the auxiliary flow path and at least one auxiliary flow path port having respective cross-sectional areas with dimensions that accommodate a respective auxiliary coolant gas flow to be subsonic, sonic, or supersonic.
6. The nozzle of claim 1 further comprising:
a splitter arranged to cause a flow within the continuous flow path to divide into multiple flow paths.
7. The nozzle of claim 6 further comprising:
a reverse auxiliary flow path port arranged to introduce a reverse auxiliary flow into the continuous flow path at the splitter.
8. The nozzle of claim 1 wherein the four or more auxiliary flow path ports comprise a first grouping of auxiliary flow path ports and wherein at least one of the converging portion, throat region, and supersonic portion define a second grouping of auxiliary flow path ports.
9. The nozzle of claim 8 wherein the jacket is a first jacket and the pressure-controllable chamber is a first pressure-controllable chamber surrounding the first grouping of auxiliary flow path ports and the nozzle further comprises:
a second jacket coupled to the nozzle forming a second pressure-controllable chamber surrounding the second grouping of auxiliary flow path ports.

10. The nozzle of claim 1 wherein a length of the flow path of the supersonic portion has increasing cross-sectional area.

11. The nozzle of claim 1 wherein a length of the flow path of the supersonic portion has constant cross-sectional area.

12. The nozzle of claim 1 wherein a length of the flow path of the supersonic portion is curved and wherein at least one auxiliary flow path port is at the curved length of the flow path of the supersonic portion.

13. The nozzle of claim 1 wherein a cross-sectional area of the outlet port is configured to accommodate a flow that is 1/10th mm to 100 mm in diameter.

14. A cold spray system, the cold spray system comprising:
a nozzle comprising (i) a converging portion that defines a flow path that decreases in cross-sectional area from an inlet port to a converging portion throat port, (ii) a throat region that defines a flow path having a cross-sectional area that matches the cross-sectional area of the converging portion throat port, (iii) a supersonic portion that defines a flow path, having a supersonic portion throat port with cross-sectional area matching the cross-sectional area of the throat region, to an outlet port, wherein the flow paths of converging portion, throat region, and supersonic portion define a continuous flow path through the nozzle from the inlet port to the outlet port and wherein at least one of the converging portion, throat region, and supersonic portion defines four or more auxiliary flow path ports symmetrically arranged with respect to a center of the continuous flow path, on an outer wall of the nozzle, configured to enable multiple auxiliary coolant gas flows to be introduced into the continuous flow path through the nozzle, (iv) a jacket coupled to the nozzle forming a pressure- controllable chamber surrounding the four or more auxiliary flow path ports, wherein a wall of the pressure-controllable chamber is the outer wall of the nozzle, and (v) a mass flow controller configured to regulate pressure in the chamber to cause the auxiliary coolant gas flows to aerodynamically focus particle flow in the continuous flow path toward the center of the continuous flow path;
a sensor measuring an output flow in the continuous flow path at the outlet port; and
a controller configured to modify at least one auxiliary coolant gas flow based on the output measured by the sensor.

15. The system of claim 14 wherein the controller is configured to perform at least one of:
modifying a path of the particle flow in the continuous flow path through the modifying the at least one auxiliary coolant gas flow;
modifying the at least one auxiliary coolant gas flow to control at least one of:
geometry and angle of the output flow at the outlet port;
modifying internal temperature of the nozzle; and
modifying material print resolution of the nozzle.

* * * * *